United States Patent
Genkin et al.

(10) Patent No.: US 11,321,615 B1
(45) Date of Patent: May 3, 2022

(54) METHOD AND SYSTEM FOR DOMAIN AGNOSTIC KNOWLEDGE EXTRACTION

(71) Applicant: BLACKSWAN TECHNOLOGIES INC., Lewes, DE (US)

(72) Inventors: Arie Genkin, Maale Adumim (IL); Szymon Klarman, Warsaw (PL)

(73) Assignee: BLACKSWAN TECHNOLOGIES INC., Lewes, DE (US)

( * ) Notice: Subject to any disclaimer, the term of this patent is extended or adjusted under 35 U.S.C. 154(b) by 0 days.

(21) Appl. No.: 17/460,623

(22) Filed: Aug. 30, 2021

(51) Int. Cl.
*G06N 5/02* (2006.01)
*G06N 20/20* (2019.01)
*G06K 9/62* (2006.01)
*G06F 16/903* (2019.01)

(52) U.S. Cl.
CPC ....... *G06N 5/022* (2013.01); *G06F 16/90335* (2019.01); *G06K 9/6218* (2013.01); *G06K 9/6256* (2013.01); *G06N 20/20* (2019.01)

(58) Field of Classification Search
CPC .. G06N 5/022; G06N 20/20; G06F 16/90335; G06K 9/6218; G06K 9/6256
See application file for complete search history.

(56) References Cited

U.S. PATENT DOCUMENTS

| | | |
|---|---|---|
| 9,058,380 B2 | 6/2015 | Lesiecki et al. |
| 2019/0278777 A1 | 9/2019 | Malik et al. |
| 2021/0012179 A1* | 1/2021 | Kalia ............... G06F 40/30 |
| 2021/0012218 A1* | 1/2021 | Croutwater ....... G06F 16/30 |
| 2021/0110278 A1* | 4/2021 | Meyerzon ......... G06F 16/355 |
| 2021/0319032 A1* | 10/2021 | Moskwinski ..... G06F 16/24575 |

FOREIGN PATENT DOCUMENTS

CN 107491555 B 11/2020

OTHER PUBLICATIONS

Heudecker, N., Ronthal, A. (Aug. 10, 2018). How to avoid Data Lake Failures. Gartner. Retrieved Oct. 5, 2021, from https://www.gartner.com/en/documents/3886263/how-to-avoid-data-lake-failures.
Asay, M. (Nov. 10, 2017). 85% of big data projects fail, but your developers can help yours succeed. TechRepublic. https://www.techrepublic.com/article/85-of-big-data-projects-fail-but-your-developers-can-help-yours-succeed/.
Gartner. (Feb. 18, 2019). Gartner Identifies Top 10 Data and Analytics Technology Trends for 2019: Trend No. 6: Data Fabric. https://www.gartner.com/en/newsroom/press-releases/2019-02-18-gartner-identifies-top-10-data-and-analytics-technolo.
Panetta, K. (Mar. 15, 2021). Gartner Top 10 Data and Analytics Trends for 2021. Gartner, https://www.gartner.com/smarterwithgartner/gartner-top-10-data-and-analytics-trends-for-2021.

(Continued)

*Primary Examiner* — David F Dunphy
(74) *Attorney, Agent, or Firm* — The Roy Gross Law Firm, LLC; Roy Gross

(57) ABSTRACT

A system and method of extracting knowledge from a plurality of documents by at least one processor may include: receiving a domain-specific schema data structure, comprising a definition of one or more domain entity types; using at least one first machine-learning (ML) based model to fetch one or more mentions from the plurality of documents; using at least one second ML model to extract, from the one or more mentions, at least one domain entity that corresponds to the one or more domain entity types; and integrating the at least one extracted domain entity into a knowledge graph, based on the domain schema.

17 Claims, 8 Drawing Sheets

(56) References Cited

OTHER PUBLICATIONS

Klarman, S. (May 19, 2020). Knowledge Graph part 1—Using AI insights to connect the dots and make better business decisions. BlackSwan Technologies Blog, https://blackswantechnologies.ai/media-room/knowledge-graph-blog-1/.
Lewis, P. (May 6, 2020). Search and Content Analytics Blog: Smarter enterprise search: why knowledge graphs and NLP can provide all the right answers. Accenture. https://www.accenture.com/us-en/blogs/search-and-content-analytics-blog/enterprise-search-knowledge-graphs.
Goasduff, L. (Oct. 19, 2020). Gartner Top 10 Trends in Data and Analytics for 2020. Gartner. https://www.gartner.com/smarterwithgartner/gartner-top-10-trends-in-data-and-analytics-for-2020.
Klarman, S. (Jun. 16, 2020). Knowledge Graph part 2—Unleash the power of your data. BlackSwan Technologies Blog. https://blackswantechnologies.ai/media-room/knowledge-graph-part-2/.
Klarman, S., & Krolak, A. (Sep. 23, 2020). Knowledge Graph part 3—The power at your fingertips. BlackSwan Technologies Blog. https://blackswantechnologies.ai/media-room/knowledge-graph-part-3/.
Harrison, P. J. (Feb. 26, 2021). BlackSwan Technologies: AI is Transforming Personalisation in Financial Services. The Fintech Tiimes. https://thefintechtimes.com/blackswan-technologies-ai-is-transforming-personalisation-in-financial-services/.
Kronz, A., Jaffri, A., Tapadinhas, J., Sun, J., & Herschel, G. (Jan. 5, 2021). Predicts 2021: Analytics, BI and Data Science Solutions—Pervasive, Democratized and Composable. Gartner, https://www.gartner.com/en/documents/3995129/predicts-2021-analytics-bi-and-data-science-solutions-pe.
BlackSwan Technologies. (Nov. 18, 2020). BlackSwan Technologies—Leader in KYC & AML Solutions 2020. BlackSwan Technologies recognized as a Global Leader in KYC & AML Solutions, https://blackswantechnologies.ai/media-room/blackswan-technologies-kyc-leader-2020/.
Wilkinson, M., Dumontier, M., Aalbersberg, I. et al. The FAIR Guiding Principles for scientific data management and stewardship. Sci Data 3, 160018 (2016). https://doi.org/10.1038/sdata.2016.18.
Mikolov, T., Chen, K., Corrado, G., & Dean, J. (2013). Efficient estimation of word representations in vector space. arXiv preprint arXiv:1301 3781.
Pennington, J., Socher, R., & Manning, C. D. (Oct. 2014). GloVe: Global vectors for word representation. In Proceedings of the 2014 conference on empirical methods in natural language processing (EMNLP) (pp. 1532-1543). doi: 10.3115/v1/D14-1162.
Sutskever, I., Vinyals, O., & Le, Q. V. (2014). Sequence to sequence learning with neural networks. In Advances in neural information processing systems (pp. 3104-3112) arXiv: 1409 3215.
Devlin, J., Chang, M. W., Lee, K., & Toutanova, K. (2018). Bert: Pre-training of deep bidirectional transformers for language understanding. arXiv preprint arXiv:1810.04805.
Liu, Y., Ott, M., Goyal, N., Du, J., Joshi, M., Chen, D., & Stoyanov, V. (2019). RoBERTa: A Robustly Optimized BERT Pretraining Approach A robustly optimized bert pretraining approach. arXiv preprint arXiv:1907.11692.
Cohen, William & Ravikumar, Pradeep & Fienberg, Stephen. (2003). A Comparison of String Metrics for Matching Names and Records. Proc of the KDD Workshop on Data Cleaning and Object Consolidation. Retrieved from: http://citeseerx.ist.psu.edu/viewdoc/download?doi=10.1.1.5.9007&rep=rep1&type=pdf.
Christen, Peter. (2006). A Comparison of Personal Name Matching: Techniques and Practical Issues. in The Second International Workshop on Mining Complex Data (MCD'06). doi: 10.1109/ICDMW.2006.2.
Chen Zhao and Yeye He. 2019. Auto-EM: End-to-end Fuzzy Entity-Matching using Pre-trained Deep Models and Transfer Learning. In The World Wide Web Conference (WWW '19). Association for Computing Machinery, New York, NY, USA, 2413-2424. DOI:https://doi.org/10.1145/3308558.3313578.
Tam, D., Monath, N., Kobren, A., Traylor, A., Das, R., & McCallum, A. (2019). Optimal transport-based alignment of earned character representations for string similarity. arXiv preprint arXiv:1907.10165.
Pradap Konda, Sanjib Das, Paul Suganthan G. C., AnHai Doan, Adel Ardalan, Jeffrey R. Ballard, Han Li, Fatemah Panahi, Haojun Zhang, Jeff Naughton, Shishir Prasad, Ganesh Krishnan, Rohit Deep, and Vijay Raghavendra. 2016. Magellan: toward building entity matching management systems. Proc. VLDB Endow. 9, 12 (Aug. 2016), 1197-1208. DOI:https://doi.org/10.14778/2994509.2994535.
Hoffer, E., & Ailon, N. (Oct. 2015). Deep metric learning using triplet network. In International workshop on similarity-based pattern recognition (pp. 84-92). Springer, Cham. arXiv:1412.6622v4; last revised Dec. 4, 2018.
Gan, Zhe & Singh, Pd & Joshi, Ameet & He, Xiaodong & Chen, Jianshu & Gao, Jianfeng & Deng, Ii. (2017). Character-level Deep Conflation for Business Data Analytics. arXiv:1702.02640v1.
Huang, G., Quo, C., Kusner, M. J., Sun, Y., Weinberger, K. Q., & Sha, F. (Dec. 2016). Supervised word mover's distance. In Proceedings of the 30th International Conference on Neural Information Processing Systems (pp. 1869-4877). Retrieved from: https://dl.acm.org/doi/10.5555/3157382.3157641.
Kusner, M., Sun, Y., Kolkin, N. & Weinberger, K.. (2015). From Word Embeddings To Document Distances. Proceedings of the 32nd International Conference on Machine Learning, in Proceedings of Machine Learning Research 37:957-966 Available from https://proceedings.mlr.press/v37/kusnerb15.html.
Harville, D., & Moore, R. (1999). Determining Record Linkage Parameters Using an Iterative Logistic Regression Approach. U.S. Bureau of the Census.
Sidharth Mudgal, Han Li, Theodoros Rekatsinas, AnHai Doan, Youngchoon Park, Ganesh Krishnan, Rohit Deep, Esteban Arcaute, and Vijay Raghavendra. 2018. Deep Learning for Entity Matching: A Design Space Exploration. In Proceedings of the 2018 International Conference on Management of Data (SIGMOD '18). Association for Computing Machinery, New York, NY, USA, 19-34. DOI:https://doi.org/10.1145/3183713.3196926.
X. Li, A. Guttmann, J. Demongeot, J. Boire and L. Ouchchane, "An empiric weight computation for record linkage using inearly combined fields' similarity scores," 2014 36th Annual International Conference of the IEEE Engineering in Medicine and Biology Society, 2014, pp. 1346-1349, doi: 10.1109/EMBC.2014.6943848.
Malkov, Yu & Yashunin, Dmitry. (2016). Efficient and Robust Approximate Nearest Neighbor Search Using Hierarchica Navigable Small World Graphs. IEEE Transactions on Pattern Analysis and Machine Intelligence. PP. doi: 10.1109/TPAMI.2018.2889473.
Jeff Johnson and Matthijs Douze and HervéJégou. Billion-scale similarity search with GPUs. (2017). arXiv:1702.08734.
Kolitsas, N., Ganea, O. E., & Hofmann, T. (2018). End-to-end neural entity linking. arXiv preprint arXiv:1808.07699.
Wu, L., Petroni, F., Josifoski, M., Riedel, S., & Zettlemoyer, L. (2019). Scalable zero-shot entity linking with dense entity retrieval. arXiv preprint arXiv:1911.03814. rev Sep. 29, 2020.
Peters, M. E., Neumann, M., Logan IV, R. L., Schwartz, R., Joshi, V., Singh, S., & Smith, N. A. (2019). Knowledge enhanced contextual word representations. arXiv preprint arXiv: 1909.04164.
Gillick, D., Kulkarni, S., Lansing, L., Presta, A., Baldridge, J., Ie, E., & Garcia-Olano, D. (2019). Learning dense representations for entity retrieval. arXiv preprint arXiv:1909.10506.
Logeswaran, L., Chang, M. W., Lee, K., Toutanova, K., Devlin, J., & Lee, H. (2019). Zero-shot entity linking by reading entity descriptions. arXiv preprint arXiv:1906.07348.
W. Shen, J. Wang and J. Han, "Entity Linking with a Knowledge Base: Issues, Techniques, and Solutions," in IEEE Transactions on Knowledge and Data Engineering, vol. 27, No. 2, pp. 443-460,Feb. 1, 2015, accepted for publication 2013. doi: 10.1109/TKDE.2014.2327028.
Yutao Zhang, Fanjin Zhang, Peiran Yao, and Jie Tang. 2018. Name Disambiguation in AMiner: Clustering, Maintenance, and Human in the Loop. In Proceedings of the 24th ACM SIGKDD International

(56) References Cited

OTHER PUBLICATIONS

Conference on Knowledge Discovery & Data Mining (KDD '18). Association for Computing Machinery, New York, NY, USA, 1002-1011. Retrieved from :https://doi.org/10.1145/3219819.3219859.

Zhang, Z., Han, X., Liu, Z., Jiang, X., Sun, M., & Liu, Q. (2019). ERNIE: Enhanced language representation with informative entities. arXiv preprint arXiv:1905.07129.

Sevgili, O., Shelmanov, A., Arkhipov, M., Panchenko, A., & Biemann, C. (2020). Neural entity linking: A survey of models based on deep learning. arXiv preprint arXiv:2006.00575.

Chen, S., Wang, J., Jiang, F., & Lin, C. Y. (Apr. 2020). Improving entity linking by modeling latent entity type Information. In Proceedings of the AAAI Conference on Artificial Intelligence (vol. 34, No. 05, pp. 7529-7537).

Yao, Y., Ye, D., Li, P., Han, X., Lin, Y., Liu, Z., & Sun, M. (2019). DocRED: A large-scale document-level relation extraction dataset. arXiv preprint arXiv:1906.06127.

Han, X., Zhu, H., Yu, P., Wang, Z., Yao, Y., Liu, Z., & Sun, M. (2018). Fewrel: A large-scale supervised few-shot relation classification dataset with state-of-the-art evaluation. arXiv preprint arXiv:1810.10147.

Riedel, S., Yao, L., & McCallum, A. (Sep. 2010). Modeling relations and their mentions without labeled text. In Joint European Conference on Machine Learning and Knowledge Discovery in Databases (pp. 148-163). Springer, Berlin, Heidelberg. Retrieved from: https://dl.acm.org/doi/10.5555/1889788.1889799.

Jat, S., Khandelwal, S., & Talukdar, P. (2018). Improving distantly supervised relation extraction using word and entity based attention. arXiv preprint arXiv:1804.06987.

Christopoulou, Fenia & Miwa, Makoto & Ananiadou, Sophia. (2019). Connecting the Dots: Document-level Neural Relation Extraction with Edge-oriented Graphs. 4927-4938 doi: 10 18653/v1/D19-1498.

Zhang, Y., Zhong, V., Chen, D., Angeli, G., & Manning, C. D. (Sep. 2017). Position-aware attention and supervised data improve slot filling. In Proceedings of the 2017 Conference on Empirical Methods in Natural Language Processing (pp. 35-45). Retrieved from: https://aclanthology.org/D17-1004; doi: 10.18653/v1/D17-1004.

Han, X., Gao, T., Yao, Y., Ye, D., Liu, Z., & Sun, M. (2019). OpenNRE: An open and extensible toolkit for neural relation extraction. arXiv preprint arXiv:1909.13078.

Mintz, M., Bills, S., Snow, R., & Jurafsky, D. (Aug. 2009). Distant supervision for relation extraction without labeled data. In Proceedings of the Joint Conference of the 47th Annual Meeting of the ACL and the 4th International Joint Conference on Natural Language Processing of the AFNLP (pp. 1003-1011). Retrieved from https://aclanthology.org/P09-1113.

Sorokin, D., & Gurevych, I. (Sep. 2017). Context-aware representations for knowledge base relation extraction. In Proceedings of the 2017 Conference on Empirical Methods in Natural Language Processing (pp. 1784-1789). Retrieved from: https://aclanthology.org/D17-1188; doi: 10.18653/v1/D17-1188.

Zeng, D., Liu, K., Chen, Y., & Zhao, J. (Sep. 2015). Distant supervision for relation extraction via piecewise convolutional neural networks. In Proceedings of the 2015 conference on empirical methods in natural language processing (pp. 1753-1762). Retrieved from: https://aclanthology.org/D15-1203; doi: 10.18653/v1/D15-1203.

Gao, T., Han, X., Zhu, H., Liu, Z., Li, P., Sun, M., & Zhou, J. (2019). FewRel 2.0: Towards more challenging few-shot relation classification arXiv preprint arXiv:1910.07124.

Vashishth, S., Joshi, R., Prayaga, S. S., Bhattacharyya, C., & Talukdar, P. (2018). Reside: Improving distantly-supervised neural relation extraction using side information. arXiv preprint arXiv:1812.04361.

He, Z., Chen, W., Li, Z., Zhang, M., Zhang, W., & Zhang, M. (Apr. 2018). SEE: Syntax-aware entity embedding for neural relation extraction. In Thirty-Second AAAI Conference on Artificial Intelligence. arXiv:1801.03603.

Fu, T., Li, P., & Ma, W. (2019). GraphRel: Modeling Text as Relational Graphs for Joint Entity and Relation Extraction. ACL. Retrieved from: https://aclanthology.org/P19-1136; doi: 10.18653/v1/P19-1136.

Distiawan, B., Weikum, G., Qi, J., & Zhang, R. (Jul. 2019). Neural relation extraction for knowledge base enrichment. In Proceedings of the 57th Annual Meeting of the Association for Computational Linguistics (pp. 229-240). Retrieved from: https://www.ruizhang.info/publications/ACL2019_Neural%20Relation%20Extraction%20for%20Knowledge%20Base%20Enrichment.pdf.

Zhao, Wentao & Zhou, Dalin & Qiu, Xinguo & Jiang, Wei. (2020). A pipeline for fair comparison of graph neural networks in node classification tasks arXiv:2012.10619.

A. Maulana and M. Atzmueller, "Centrality-Based Anomaly Detection on Multi-Layer Networks Using Many-Objective Optimization," 2020 7th International Conference on Control, Decision and Information Technologies (CoDIT), 2020, pp. 633-638, doi: 10.1109/CoDIT49905.2020.9263819.

Hu, R., Aggarwal, C. C., Ma, S., & Huai, J. (2016). An embedding approach to anomaly detection. 2016 IEEE 32nd International Conference on Data Engineering (ICDE). doi: 10.1109/icde.2016.7498256.

Jiawei, Zhang & Zhang, Haopeng & Sun, Li & Xia, Congying. (2020). Graph-Bert: Only Attention is Needed for Learning Graph Representations. arXiv:2001.05140.

Chami, I., Abu-El-Haija, S., Perozzi, B., Ré, C., & Murphy, K. (2020). Machine learning on graphs: A model and comprehensive taxonomy. arXiv preprint arXiv:2005.03675.

Wang, Xuhong & Jin, Baihong & Du, Ying & Cui, Ping & Tan, Yingshui & Yang, Yupu. (2021). One-class graph neural networks for anomaly detection in attributed networks. Neural Computing and Applications. 33. doi: 10.1007/s00521-021-05924-9.

A. Chaudhary, H. Mittal and A. Arora, "Anomaly Detection using Graph Neural Networks," 2019 International Conference on Machine Learning, Big Data, Cloud and Parallel Computing (COMITCon), 2019, pp. 346-350, doi 10.1109/COMITCon.2019.8862186.

Ji, S., Pan, S., Cambria, E., Marttinen, P., & Philip, S. Y. (2021). A survey on knowledge graphs: Representation, acquisition, and applications. IEEE Transactions on Neural Networks and Learning Systems, doi: 10.1109/TNNLS.2021.3070843.

F. Lu, P. Cong and X. Huang, "Utilizing Textual Information in Knowledge Graph Embedding: A Survey of Methods and Applications," in IEEE Access, vol. 8, pp. 92072-92088, 2020, doi: 10.1109/ACCESS.2020.2995074.

Junheng Hao, Muhao Chen, Wenchao Yu, Yizhou Sun, and Wei Wang. 2019. Universal Representation Learning of Knowledge Bases by Jointly Embedding Instances and Ontological Concepts. In Proceedings of the 25th ACM SIGKDD International Conference on Knowledge Discovery & Data Mining (KDD '19). Association for Computing Machinery, New York, NY, USA, 1709-1719. DOI:https://doi.org/10.1145/3292500.3330838.

Xu, M. (2020). Understanding graph embedding methods and their applications. arXiv preprint arXiv:2012.08019.

Q. Wang, Z. Mao, B. Wang and L. Guo, "Knowledge Graph Embedding: A Survey of Approaches and Applications," in IEEE Transactions on Knowledge and Data Engineering, vol. 29, No. 12, pp. 2724-2743, Dec. 1, 2017, doi: 10.1109/TKDE.2017.2754499.

Cui, Z., Kapanipathi, P., Talamadupula, K., Gao, T., & Ji, Q. (2020). Type-augmented Relation Prediction in Knowledge Graphs. arXiv preprint arXiv:2009.07938.

Zhang, Y., Yao, Q., Dai, W., & Chen, L. (Apr. 2020). AutoSF: Searching scoring functions for knowledge graph embedding. In 2020 IEEE 36th International Conference on Data Engineering (ICDE) (pp. 433-444). IEEE. arXiv:1904.11682.

Gu, Y., Guan, Y., & Missier, P. (2020). Towards learning instantiated logical rules from knowledge graphs. arXiv preprint arXiv:2003.06071.

Nguyen, D. Q. (Dec. 2020). A survey of embedding models of entities and relationships for knowledge graph completion. In Proceedings of the Graph-based Methods for Natural Language Processing (TextGraphs) (pp. 1-14). Retrieved from: https://aclanthology.org/2020.textgraphs-1.1; doi: 10.18653/v1/2020.textgraphs-1.1.

(56) References Cited

OTHER PUBLICATIONS

Ali, M., Berrendorf, M., Hoyt, C. T., Vermue, L., Galkin, M., Sharifzadeh, S., & Lehmann, J. (2020). Bringing light into the dark: A large-scale evaluation of knowledge graph embedding models under a unified framework. arXiv preprint arXiv:2006.13365.

Xu, D., Ruan, C., Korpeoglu, E., Kumar, S., & Achan, K. (Jan. 2020). Product knowledge graph embedding for e-commerce. In Proceedings of the 13th international conference on web search and data mining (pp. 672-680). doi:10.1145/3336191.3371778.

Zhang, W., Paudel, B., Wang, L., Chen, J., Zhu, H., Zhang, W., & Chen, H. (May 2019). Iteratively learning embeddings and rules for knowledge graph reasoning. In The World Wide Web Conference (pp. 2366-2377). arXiv:1903.08948.

Fatemi, B., Ravanbakhsh, S., & Poole, D. (Jul. 2019). Improved knowledge graph embedding using background taxonomic information. In Proceedings of the AAAI Conference on Artificial Intelligence (vol. 33, No. 01, pp. 3526-3533). DOI: https://doi.org/10.1609/aaai.v33i01.33013526.

Chen, S., Liu, X., Gao, J., Jiao, J., Zhang, R., & Ji, Y. (2020). HittER: Hierarchical Transformers for Knowledge Graph Embeddings. arXiv preprint arXiv:2008.12813.

Dai Quoc Nguyen, T. D. N., & Phung, D. (Apr. 2020). A Relational Memory-based Embedding Model for Triple Classification and Search Personalization. In Proceedings of the 58th Annual Meeting of the Association for Computational Linguistics (ACL) (pp. 3429-3435). Retrieved from: https://aclanthology.org/2020.acl-main.313.pdf.

Han, X., Cao, S., Lv, X., Lin, Y., Liu, Z., Sun, M., & Li, J. (Nov. 2018). Openke: An open toolkit for knowledge embedding. In Proceedings of the 2018 conference on empirical methods in natural language processing: system demonstrations (pp. 139-144). Retrieved from: https://aclanthology.org/D18-2024; doi: 10.18653/v1/D18-2024.

Vashishth, S., Sanyal, S., Nitin, V., & Talukdar, P. (2019). Composition-based multi-relational graph convolutional networks. arXiv preprint arXiv:1911.03082.

Zaidi, E., & de Simoni, G. (Sep. 12, 2019). Augmented Data Catalogs: Now an Enterprise Must-Have for Data and Analytics Leaders. Gartner. https://www.gartner.com/en/documents/3957301/augmented-data-catalogs-now-an-enterprise-must-have-for-.

Zaidi, E., Thoo, E., de Simoni, G., & Beyer, M. (Dec. 17, 2019). Data Fabrics Add Augmented Intelligence to Modernize Your Data Integration. Gartner. https://www.gartner.com/en/documents/3978267/data-fabrics-add-augmented-intelligence-to-modernize-you.

Beyer, M., & Zaidi, E. (Jul. 16, 2020). How to Activate Metadata to Enable a Composable Data Fabric. Gartner. https://www.gartner.com/en/documents/3987615-how-to-activate-metadata-to-enable-a-composable-data-fab.

Jaffri, A. (May 27, 2020). How to Build Knowledge Graphs That Enable AI-Driven Enterprise Applications. Gartner. https://www.gartner.com/en/documents/3985680-how-to-build-knowledge-graphs-that-enable-ai-driven-ente.

Jain, A., de Simoni, G., Chien, M., & Zaidi, E. (Sep. 11, 2019). Modern Data and Analytics Requirements Demand a Convergence of Data Management Capabilities. Gartner. https://www.gartner.com/en/documents/3957246-modern-data-and-analytics-requirements-demand-a-converge.

Dehghani, Z. (May 20, 2019). How to Move Beyond a Monolithic Data Lake to a Distributed Data Mesh. MartinFowler. https://martinfowler.com/articles/data-monolith-to-mesh.html.

Beyer, M., Sallam, R., Hare, J., den Hamer, P., Jaffri, A., & Adrian, M. (Dec. 7, 2020). What Is 'Graph?'—An Elementary Version for the Uninitiated. Gartner. https://www.gartner.com/en/documents/3994041-what-is-graph-an-elementary-version-for-the-uninitiated.

Beyer, A., & Duncan, A. (Mar. 23, 2021). Enable an "Integration Always" Approach From the CDO Down. Gartner. https://www.gartner.com/en/documents/3999718/enable-an-integration-always-approach-from-the-cdo-down.

Moore, S. (Feb. 18, 2019). Gartner Identifies Top 10 Data and Analytics Technology Trends for 2019. Gartner. https://www.gartner.com/en/newsroom/press-releases/2019-02-18-gartner-identifies-top-10-data-and-analytics-technolo.

\* cited by examiner

METHOD AND SYSTEM FOR DOMAIN AGNOSTIC KNOWLEDGE EXTRACTION

FIELD OF THE INVENTION

The present invention relates generally to the field of data management. More specifically, the present invention relates to domain-agnostic extraction and/or integration of knowledge from a plurality of data sources.

BACKGROUND OF THE INVENTION

Currently available solutions for extraction of knowledge from multiple heterogeneous data sources must be trained on large amounts of data in narrow, specialized domains, whose precise interpretation is typically carried out by human experts. Such training data is a very expensive and scarce resource. Moreover, currently available solutions typically rely on specialized machine learning models trained for knowledge extraction in specific domains (e.g., a medical domain, a banking domain, etc.), rendering them irrelevant for other domains and applications.

In addition, currently available systems and methods for data management may extract data from dynamic data sources such as web pages, and replicate this data into a single, uniform repository such as a "data lake" for further analysis. A drawback of this approach may include using irrelevant data, or data that is not up-to-date.

SUMMARY OF THE INVENTION

A system and method of real-time, domain agnostic data extraction, data integration and data management is therefore required.

The following table, Table 1, includes a glossary of terms used herein.

TABLE 1

| | |
|---|---|
| Data source 20 (e.g., private data source, public data source) | The term "Data source" may be used herein to indicate any type of online and/or locally stored data. This includes, for example: (a) private data sources, such as databases, webpages, data storage entities and the like that may be specific or proprietary to a specific person or organization; and (b) public data sources such as databases, webpages, data storage entities, etc. that may be publicly accessible (e.g., via the Internet). Data sources may be, may include or may store one or more documents. |
| Document 20' | The term "document" may be used herein to refer to data elements such as web pages, textual documents (e.g., emails), audio files, transcribed audio files, video files, transcribed video files, etc. Additionally, or alternatively, the term "document" may be used herein to refer to a content of a data source.<br>For example, a "data source" may be an SQL database. Accordingly, in such embodiments, a "document" may refer to an entry in the database that may be obtained, for example via an SQL query or a predetermined API, as known in the art.<br>Embodiments may receive one or more documents from one or more corresponding data sources, and may act on the received documents as elaborated herein. Accordingly, the terms "data sources" and "documents" may be used herein interchangeably, according to context. |
| Structured data, semi-structured data, unstructured data | The term "structured data" may be used herein to indicate data that is organized (e.g., in a database) in a predefined (e.g., tabular) format.<br>The term "semi-structured data" may be used herein to indicate a form of structured data that may not obey a tabular structure, but may nonetheless contain markers to separate elements, thus enforcing hierarchies of records and fields within the data.<br>The term "unstructured data" may be used herein to refer to information that may not be arranged according to a pre-set data model or schema. This includes, for example text documents such as email messages, videos, photos, webpages, and audio files. |
| Domain, Domain application | The term "domain" may be used herein to indicate a business field, or a field of knowledge to which embodiments of the invention may be applied. In this context, a "domain" may encompass, for example business terms and/or Information Technology (IT) resources that may be used by embodiments of the invention to automatically build domain-specific applications, that may consume data according to specific use cases.<br>For example, in a domain of online commerce, a domain application for a specific use case may be an application for assessing risk of fraud. In this domain, key business terms may include a "client", a "merchant", a "currency", a "price", a "credit card", an "issuer", etc. A domain-specific IT resource in this example may include a database of a card issuer, a server of an acquirer and/or a bank, a web site of a merchant, and the like. |
| Domain entity | The term "domain entity" may be used herein to indicate a data element that may be attributed information pertaining to a relevant domain.<br>For example, in the domain of corporate structure, key business terms may include organizations and people. In this example, a first type of a domain entity may be an "organization", and a second type of a domain entity may be a "person". A specific instantiation of an organization domain entity may, for example be attributed an organization name (e.g., "Microsoft"), information regarding a field of business, economic condition, and the like. A specific instantiation |

TABLE 1-continued

| | |
|---|---|
| | of a "person" domain entity may be attributed a name (e.g., "John Doe), an age, and the like. |
| Domain schema, domain schema definition, domain entity type, domain attribute type, domain relation type. | The term "domain schema" may be used herein to indicate a data structure, that may include one or more objects or definitions pertaining to domain entities. Such objects or definitions may include for example (a) domain entity types, (b) domain attribute types, and (c) domain relation types (defining relations between the domain entity types). Pertaining to the example of a corporate structure domain, a domain schema may: (a) define domain entity types of "organization" and "person", (b) define a "name" domain attribute type for the "organization" and "person" entity types, and (c) define relations between entity types, such as a role of a person in an organization (e.g., an employee, an ex-employee, etc.) or whether a person is a shareholder of the organization. |
| Knowledge Graph (KG) | The term KG may be used herein to indicate a domain-specific data structure that may represent a collection of interlinked instances of domain entities. These instances of domain entities may be described by formal semantics that allow both people and computers to process them in an efficient and unambiguous manner.<br>As elaborated herein, embodiments of the invention may receive or produce one or more domain schemas, and may use the definitions in the domain schema as a scaffold or template for producing a KG. Additionally, embodiments may produce or configure a domain-specific application that may utilize the information maintained in the KG. |
| Mention | The term "mention" may be used herein to indicate an appearance of a data element, that may be relevant to a domain entity, in at least one data source. For example, a mention may include a mention of an entity in a data source, which may indicate appearance of information relevant to a specific domain entity. In another example, a mention may include a mention of an attribute in a data source, which may indicate appearance of a domain attribute in the data source. In another example, a mention may include a mention of a relation in a data source, which may indicate appearance of a domain relation in the data source.<br>For example, consider the following textual data source: "Satya Narayana Nadella is a business executive. He is the chief executive officer of Microsoft, succeeding Steve Ballmer since 2014". In this example, "Satya Narayana Nadella", "Steve Ballmer" and "Microsoft" may be mentions of entities (e.g., first person, second person and organization) having respective name attributes, and "chief executive officer" may be a mention of relation, defining a relation between "Satya Narayana Nadella" and "Microsoft". |
| Entity resolution, Attribute resolution, Relation resolution. | Embodiments of the invention may be configured to apply a process referred to herein as "resolution" on the mentions (e.g., entity resolution, attribute resolution, relation resolution respectively) to assess relevance of a plurality of mentions and extract information pertaining to one or more domain entities.<br>For example, in the domain of films and entertainment, a domain application may be directed to producing variety stories. A first mention may be an appearance of a name of a famous actor (e.g., "John Doe") in a data source that is a video report regarding a film premiere in Cannes. A second mention may be an appearance of the same name as a groom, in a data source that is a textual article regarding a wedding, on a web page. Embodiments of the invention may be adapted to fetch the two mentions, resolve the mentions (e.g., determine whether both mentions relate to the actor), and produce a domain entity representing the actor, attributed with the actor's presence in Cannes and the actor's marital status. |
| Knowledge mesh | The term "knowledge mesh" may be used herein to indicate a distributed data architecture that may encompass information pertaining to a plurality of domains.<br>As elaborated herein, embodiments of the invention may facilitate extraction of information that is maintained in a knowledge mesh, to produce one or more domain-specific KGs, and corresponding applications that may consume respective domain-specific data. To this end, information maintained in a knowledge mesh may be reusable among a plurality of domain-specific applications. |
| Semantic vocabulary, semantic web, public semantic web | The terms "semantic vocabulary", "semantic web", "public semantic web", "semantic knowledge base" and the like may be used herein interchangeably to refer to a knowledge base may include formal definitions or encodings of semantic terms (e.g., concepts, entities, relations, categories, etc.) in an effort to make any exchanged data (e.g., unstructured text data) machine-understandable. Examples for a public semantic vocabulary include for example wikidata.org (e.g., https://www.wikidata.org), schema.org (e.g., http://schema.org/), and the like.<br>For example, an entry of a "person" in a public semantic vocabulary (e.g., https://schema.org/Person) may include a plurality of related attributes (e.g., "name", "additional name", "address", "birth date", |

TABLE 1-continued etc.) that define a person. Each attribute may be associated with a respective type (e.g., "address" being of type "text") and corresponding descriptions (e.g., address being a "physical address of the item").

Embodiments of the invention may include a practical application for efficiently managing large quantities of data, in a scalable, and configurable manner, as elaborated herein.

For example, embodiments of the invention may employ KG technology, to dynamically process enormous amounts of information, such as unstructured information included in an influx of documents, and integrate this data in a manner that is understandable by both a machine and a human user. Embodiments of the invention may facilitate focus on specific domain entities to uncover non-obvious relationships between entities and use that knowledge to categorize and/or organize the data. Embodiments of the invention may employ Machine Learning (ML) based technology to continuously update the KG and create new knowledge pertaining to domain entities and their relationships.

In another example, embodiments of the invention may receive (e.g., from a user and/or a software application) a query for data. Embodiments of the invention may utilize relevant KGs to provide all relevant pieces of information in a comprehensive, consistent map. Such a map may be specifically helpful in assisting decision makers and stakeholders to gain insight of the underlying information in any required level of granularity, depth, and precision.

Currently available data management technology may employ "data lake" or "data warehouse" data architectures, that require replicating information into a single, uniform repository.

Embodiments of the invention may include an improvement of currently available technology by performing data virtualization, rather than replicating the maintained data into such a uniform repository. In other words, embodiments of the invention may maintain information (e.g., data elements pertaining to specific domain entities) at data sources where that information originally resides, as long as it is discoverable and accessible. It may be appreciated that this approach may be more suited to the decentralized manner in which data is normally located in modern organizations, and may allow real-time, or near-real time consumption of up-to-date information.

Currently available approaches for producing domain-specific applications (that may consume domain specific data) either rely on a highly manual effort or are tailored to very narrowly defined applications domains, where automation relies on extensive knowledge of an application's thematic scope, and on the data sources to be integrated.

Embodiments of the invention may include an improvement of currently available technology of data management and/or data integration by generalizing and automating construction of KGs in a domain-agnostic manner. In other words, embodiments of the invention may be configured to extract, enrich and/or manage data in a KG, so as to accommodate data management, integration and/or analysis in any domain. Embodiments of the invention may thus reduce the effort required for building specialized KG-based applications, as elaborated herein. Moreover, embodiments of the invention may retrieve data that is up-to-date, and integrate this data into a KG, to facilitate accurate data analytics in real-time, or near real time.

Embodiments of the invention may exploit a synergy of a plurality (e.g., three) separate technologies or processes, to efficiently manage information on a KG. These processes are referred to herein as: (a) semantic linking; (b) distantly supervised machine learning; and (c) entity resolution.

Currently available solutions for extraction of knowledge from multiple heterogeneous data sources must be trained on large amounts of data in narrow, specialized domains, whose precise interpretation is typically carried out by human experts. Such training data is a very expensive and scarce resource. Additionally, currently available solutions rely on specialized machine learning models trained for knowledge extraction in specific domains (e.g., a medical domain, a banking domain, etc.), rendering them irrelevant for other domains and applications.

Embodiments of the invention may use existing, cross-domain semantic knowledge bases such as wikidata.org, schema.org, etc. to efficiently train domain-specific ML-based data extraction models, as elaborated herein.

Embodiments of the invention may receive (e.g., via user input or user interface 7 of FIG. 1) a semantic mapping or association between at least one schema object, such as a definition of a domain entity type, and one or more corresponding terms in those semantic vocabularies.

For example, a semantic association or mapping may link a domain entity type such as a "person" in a domain schema, to terms such as "person", "human", "man", "woman", etc. in a semantic vocabulary. Embodiments of the invention may thus formally establish the semantic meaning of at least one schema object, e.g., the "person" domain entity type based on the semantic vocabulary.

In another example, a semantic association or mapping may link a domain relation type, such as a "employee" to terms such as "employee", "worker", "member", "manager", etc. in a semantic vocabulary. Embodiments of the invention may thus formally establish the semantic meaning of a schema object such as the "employee" domain relation type based on the semantic vocabulary.

In another example, a semantic association or mapping may link a domain attribute type such as "DOB" (date of birth) to terms such as "DOB", "Date of birth", "Birthday", "Birth date", "birthdate", etc. in a semantic vocabulary (e.g., http://schema.org/birthDate). Embodiments of the invention may thus formally establish, or assert the semantic meaning of a relevant schema object, based on the semantic vocabulary. In this example, embodiments of the invention may assert the meaning of "DOB" as representing a birth date, based on the mapping to relevant entries in the semantic vocabulary.

Embodiments of the invention may use the formal definition of the semantic vocabulary as a source of structured true data, and may match this data automatically against a large corpus of text documents to add annotations over the corpus. In other words, by linking or mapping objects of the domain schema to the semantic vocabulary, embodiments of the invention may obtain annotation or labeling of these objects based on their semantic meaning.

It may be appreciated that public semantic knowledge-bases include large sets of instances of different domain entity types. For example, the domain entity type "Human" in the public semantic knowledgebase Wikidata (e.g., https://wikidata.org/wiki/Q5) includes approximately 9 million entries of real-world people, such as George Washington (http://www.wikidata.org/entity/Q23) and Giovanni Boccaccio (http://www.wikidata.org/entity/Q1402). Embodiments of the invention may use the names of these people to automatically annotate or label text in an arbitrary text corpora. For example, embodiments may mark instantiations of "George Washington" in a text file as representing a "person" domain entity. Embodiments of the invention may thus create, from the arbitrary text corpora, a training dataset of labeled text elements. In this example, the training dataset may include a plurality of documents (e.g., text data elements) in which locations of people (e.g., Giovanni Boccaccio, George Washington) are marked as pertaining to "Person" domain entities. Embodiments of the invention may subsequently use this training dataset to automatically train a machine learning model to extract domain entities of type "Person" and/or "Human" from newly introduced text. Additionally, or alternatively, embodiments of the invention may continuously (e.g., repeatedly over time) refine the training of the machine learning model based on incoming documents (e.g., text data elements).

Embodiments of the invention may then use the annotated corpus to train domain specific, ML-based knowledge extractors for specific types of entities, relationships and/or attributes in those vocabularies. Such training of ML models that is based on third party annotation (e.g., annotation achieved by a semantic vocabulary) may be referred herein as training by distant supervision.

In other words, embodiments of the invention may link or map objects of a domain schema with corresponding terms of semantic vocabularies, and thus automatically generate domain-specific, ML-based knowledge extraction tools.

It may be appreciated that the process of mapping or associating domain schema objects to corresponding terms in a semantic vocabulary, e.g., via a data structure such as a table, may be dramatically simpler than training of domain-specific ML-based knowledge extraction tools for each domain.

Embodiments of the invention may thus include an improvement over currently available knowledge extraction technology by providing a domain-agnostic, configurable platform to extract domain-specific knowledge from large corpora of documents.

Embodiments of the invention may automatically produce or configure domain-specific applications that may consume domain-specific information as defined by the domain schema and the mapping to terms of the semantic vocabulary. Thus, embodiments of the invention may include an improvement over currently available knowledge extraction technology by facilitating automation and reusability of the resulting knowledge graph for not one, but multiple arbitrary domains.

Embodiments of the invention may repurpose public knowledge repositories (e.g., wikidata.org (e.g., https://www.wikidata.org), schema.org (e.g., http://schema.org/) and the like) as an input for large scale machine learning processes, and may combine the collaboratively maintained public knowledge resources with expert knowledge of the meaning of domain-specific schema objects as input for training ML-based knowledge extraction models.

Embodiments of the invention may perform a process that is referred to herein as "entity resolution", to addresses the problem of disentangling mentions that refer to different entities. The problem is particularly challenging when a large number of mentions is obtained at a time and there is no possibility to label the data with the help of domain experts.

High-scale entity resolution aims to solve the task of detecting whether a pair of mentions refer to the same entity, for large number (e.g., millions) of pairs in a reasonable amount of time.

The task of entity resolution can be formulated in terms of inputs and outputs in different ways. For example, a single group of mentions of the same real-world entities may be taken as input. Embodiments of the invention may cluster these mentions into clusters in a clustering model, where each cluster represents a distinct real-world entity. Such clustering may be referred as the clustering model's output.

Currently available solutions for entity resolution employ large amounts of expert-annotated, domain-specific training data, which allow training dedicated, domain-specific algorithms.

Embodiments of the invention may include an improvement over currently available solutions for entity resolution, by doing without expert-annotated data. Instead, embodiments of the invention may acquire annotated data from the semantic mapping or association of domain attribute types to terms of public knowledge resources (e.g., semantic vocabularies), as elaborated herein. Embodiments of the invention may then rely on generic (e.g., domain agnostic) attribute similarity functions, to calculate similarity among mentions, and cluster these mentions without requiring expert annotated data.

Embodiments of the invention may implement entity resolution as a hierarchical process, to facilitate scalability. The term "scalability" may be used in this context to indicate ability to manage or handle various amounts of incoming data by predefined amount of computing resource (e.g., processors, computing time, computing cycles, etc.).

According to some embodiments, the hierarchical entity resolution process may include (a) a blocking module, (b) an entity matching module, and (c) a clustering module.

According to some embodiments, the blocking module may be configured to solve the task of finding pairs of mentions that may indicate, or pertain to the same real-world entity, with high probability. The blocking module may be formed to be highly scalable to large portions of data. The entity matching module computes fine-grained similarities for the prefiltered pairs of mentions. The entity matching module may be formed to produce high precision results, and may thus be allowed to have lower performance in relation to the blocking module. The output of the entity matching module may be a data structure, such as a matrix, which associates each pair of mentions to a specific calculated similarity score. The clustering module may receive the matrix of pairwise similarities from the entity matching module, and cluster the entities into clusters, wherein each cluster represents a real-world entity. The clustering module may thus determine which of the mentions form the same real-world entities.

Embodiments of the invention may thus include an improvement over currently available entity resolution technology by facilitating domain-agnostic entity matching. This type of entity matching may be derived from automatically learnt similarities, based on the semantic mapping or association of domain schema objects to terms in a semantic vocabulary.

Additionally, the hierarchical implementation of entity resolution allows embodiments of the invention to prefilter mentions in a configurable manner, according to initial similarity scores. Embodiments of the invention may thus include an improvement over currently available entity resolution technology by facilitating scalability of the quantity of incoming data, while maintaining a predetermined level of accuracy and performance.

Embodiments of the invention may include a method of extracting knowledge from a plurality of documents, by at least one processor.

According to some embodiments, the at least one processor may: receive a domain-specific schema data structure that may include a definition of one or more domain entity types; use at least one first ML-based model to fetch one or more mentions from the plurality of documents; and use at least one second ML model to extract, from the one or more mentions, at least one domain entity that corresponds to the one or more domain entity types.

The at least one processor may subsequently (a) build a knowledge graph (KG) that may include the at least one extracted domain entity based on the domain schema; and/or (b) integrate the at least one extracted domain entity into a KG, based on the domain schema.

According to some embodiments, the at least one processor may produce at least one domain-specific application, to consume data from the KG; receive at least one query pertaining to a domain entity in the KG; and apply the domain-specific application on the KG, to produce a response to the at least one query.

According to some embodiments, the at least one processor may associate or map at least one domain entity type, defined by the schema, to one or more corresponding terms defined by a semantic vocabulary knowledge base. The at least one processor may obtain from the semantic vocabulary knowledge base one or more identifiers of domain entity instantiations, based on the mapping; annotate one or more first documents of the plurality of documents according to the one or more identifiers; train the at least one first ML model based on the one or more annotated first documents to associate at least one data element in a document of the plurality of documents to the at least one domain entity type; and fetch one or more mentions of entities from the plurality of documents, based on the association.

According to some embodiments, the domain-specific schema may include a definition of one or more domain relation types. The at least one first ML model may be trained to fetch one or more mentions of relations from the plurality of documents.

Additionally, or alternatively, the domain-specific schema may include a definition of one or more domain attribute types, and the at least one first ML model may be trained to fetch one or more mentions of attributes from the plurality of documents.

According to some embodiments, the at least one processor may be configured to map at least one domain relation type, defined by the schema, to one or more corresponding terms defined by a semantic vocabulary knowledge base; obtain from the semantic vocabulary knowledge base one or more identifiers of domain relation instantiations, based on the mapping; annotate one or more first documents of the plurality of documents according to the one or more identifiers; train the at least one first ML model based on the one or more annotated first documents to associate at least one data element in a document of the plurality of documents to the at least one domain relation type; and fetch one or more mentions of relations from the plurality of documents, based on said association.

According to some embodiments, the at least one processor may use the at least one second ML model to obtain from the one or more mentions of relations, at least one domain relation that corresponds to the one or more domain relation types. The at least one processor may subsequently integrate the at least one domain relation into the KG, based on the domain schema.

Additionally, or alternatively, the at least one processor may map at least one domain attribute type, defined by the schema, to one or more corresponding terms defined by a semantic vocabulary knowledge base; obtain from the semantic vocabulary knowledge base one or more identifiers of domain attribute instantiations, based on the mapping; annotate one or more first documents of the plurality of documents according to the one or more identifiers; train the at least one first ML model based on the one or more annotated first documents to associate at least one data element in a document of the plurality of documents to the at least one domain attribute type; and fetch one or more mentions of attributes from the plurality of documents, based on said association.

According to some embodiments, the at least one processor may use the at least one second ML model to obtain from the one or more mentions of attributes, at least one domain attribute that corresponds to the one or more domain relation types; and integrate the at least one domain attribute into the KG, based on the domain schema, as elaborated herein.

According to some embodiments, the at least one processor may obtain at least one domain entity from the one or more mentions by: receiving, from the at least one first ML model a plurality of mentions that correspond to a domain entity type defined by the schema; using the at least one second ML model to cluster the plurality of mentions into clusters, wherein each cluster represents a domain entity; and producing at least one domain entity based on the clustering.

According to some embodiments, the at least one processor may calculate a first similarity score, representing similarity among two or more mentions of the plurality of mentions; based on the first similarity score, the at least one processor may calculate a second similarity score, representing similarity among the two or more mentions; and use the second ML model to cluster the two or more mentions into clusters, based on the second similarity score, as elaborated herein.

According to some embodiments, the first similarity score may represent similarity in a first resolution or precision level, and the second similarity score may represent similarity in a second, superior resolution or precision level.

According to some embodiments, the one or more mentions of attributes may include a plurality of attributes. The at least one processor may obtain a first mention of attribute from the plurality of attributes; obtain a second mention of attribute from the plurality of attributes; reconcile between a first mention of attribute and the second mention of attribute, to produce a common attribute; and integrate the common attribute into the KG, based on the domain schema.

Embodiments of the invention may include a system for extracting knowledge from a plurality of documents. Embodiments of the system may include: a non-transitory memory device, wherein modules of instruction code may be stored, and at least one processor associated with the memory device, and configured to execute the modules of instruction code. Upon execution of said modules of instruction code, the at least one processor may be configured to: receive a domain-specific schema data structure, may include a definition of one or more domain entity types; use at least one first ML based model to fetch one or more mentions from the plurality of documents; use at least one second ML model to extract, from the one or more mentions, at least one domain entity that corresponds to the one or more domain entity types; and integrate the at least one extracted domain entity into a KG, based on the domain schema.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
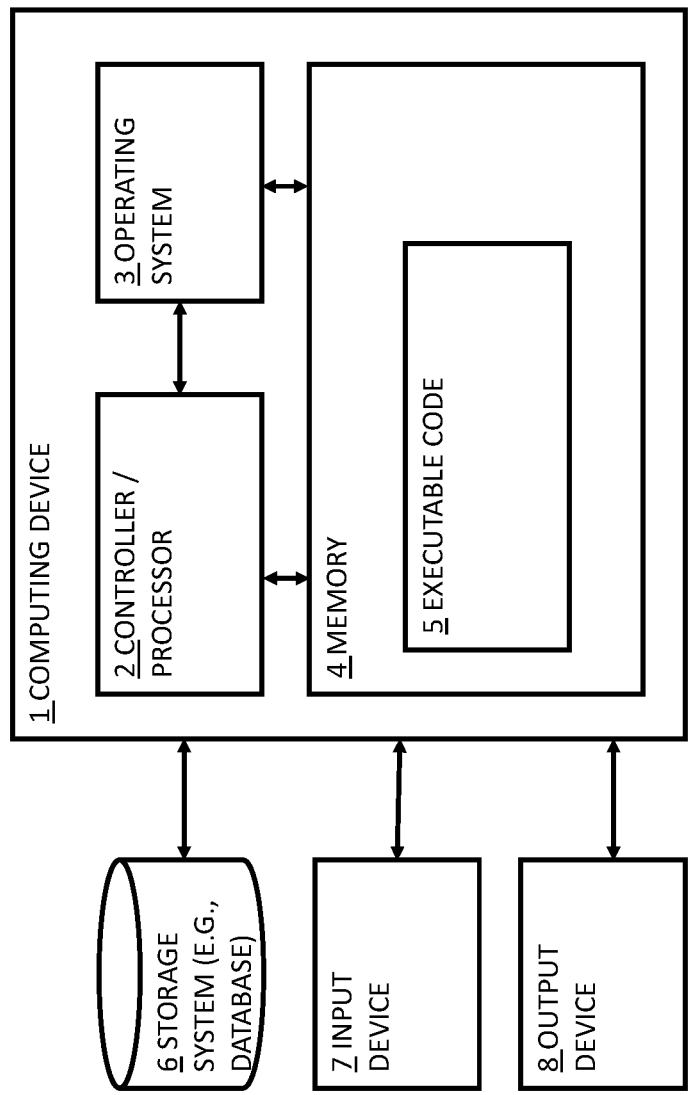
FIG. 1 is a block diagram, depicting a computing device which may be included in a system for domain-agnostic extraction and/or integration of knowledge from a plurality of data sources according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

Reference is now made to FIG. 1, which is a block diagram depicting a computing device, which may be included within an embodiment of a system for domain-agnostic extraction and/or integration of knowledge, according to some embodiments.

Computing device 1 may include a processor or controller 2 that may be, for example, a central processing unit (CPU) processor, a chip or any suitable computing or computational device, an operating system 3, a memory 4, executable code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task, or script. Executable code 5 may be executed by processor or controller 2 possibly under control of operating system 3. For example, executable code 5 may be an application that may perform domain-agnostic extraction and/or integration of knowledge as further described herein. Although, for the sake of clarity, a single item of executable code 5 is shown in FIG. 1, a system according to some embodiments of the invention may include a plurality of executable code segments similar to executable code 5 that may be loaded into memory 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data pertaining to content of a corpus of documents (e.g., text documents) may be stored in storage system 6 and may be loaded from storage system 6 into memory 4 where it may be processed by processor or controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components, or systems, e.g., a detachable keyboard or keypad, a mouse, and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

A neural network (NN) or an artificial neural network (ANN), e.g., a neural network implementing a machine learning (ML) or artificial intelligence (AI) function, may refer to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g., CPUs or graphics processing units (GPUs), or a dedicated hardware device may perform the relevant calculations.

Figure 2:
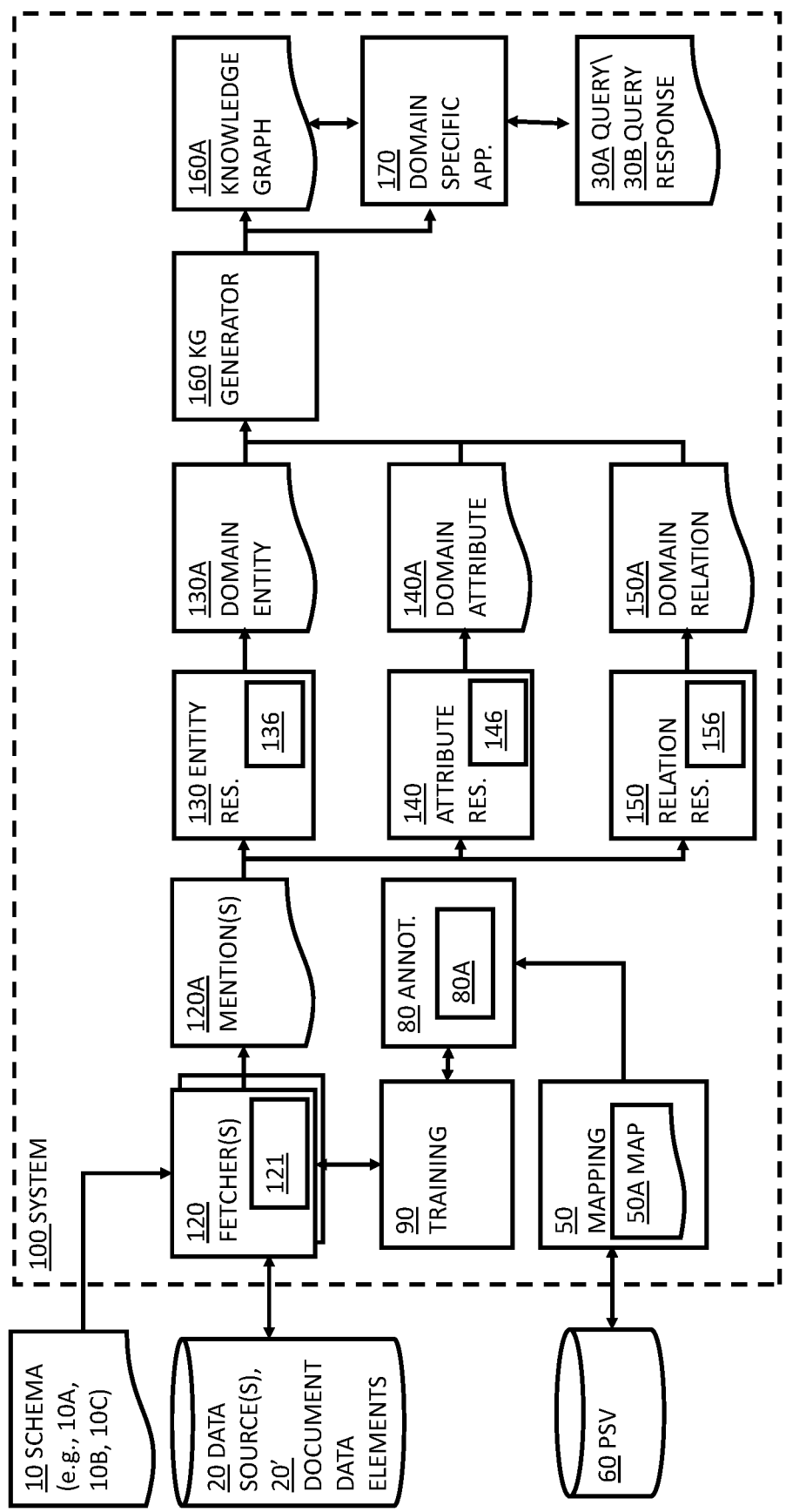
FIG. 2 is a block diagram, depicting an overview of a system for domain-agnostic extraction and/or integration of knowledge, according to some embodiments of the invention.

Reference is now made to FIG. 2, which depicts an overview of a system 100 for domain-agnostic extraction and/or integration of knowledge, from a plurality of data sources 20 (e.g., databases, webpages, data storage entities and the like) according to some embodiments of the invention. According to some embodiments of the invention, system 100 may be implemented as a software module, a hardware module, or any combination thereof. For example, system 100 may be, or may include a computing device such as element 1 of FIG. 1, and may be adapted to execute one or more modules of executable code (e.g., element 5 of FIG. 1) to perform extraction and/or integration of knowledge, as further described herein. In another example, system 100 may be or may include a distributed computing system, where different modules or components of system 100 may be implemented on separate computing devices 1.

As shown in FIG. 2, arrows may represent flow of one or more data elements to and from system 100 and/or among modules or elements of system 100. Some arrows have been omitted in FIG. 2 for the purpose of clarity.

According to some embodiments, system 100 may include, may be associated with, or may be communicatively connected (e.g., via the Internet) to one or more data sources 20. Data sources 20 may be, may include, or may store one or more documents 20' such as web pages, textual documents (e.g., emails), audio files, transcribed audio files, video files, transcribed video files, etc. It may be appreciated that system 100 may receive the one or more documents 20' from data sources 20, and may act on documents 20' as elaborated herein. Therefore, the terms data sources 20 and documents 20' may be used herein interchangeably, according to context.

As shown in FIG. 2, system 100 may receive, e.g., from a user interface (UI, such as input element 7 of FIG. 1) or from a software application, a domain-specific schema data structure 10. Domain-specific schema data structure 10 (or domain schema 10, for short) may be implemented as, or may include a graph database schema or relational schema or Entity-Relation (ER) diagram as known in the art, and may be stored in a database such as storage system 6 of FIG. 1.

Figure 3:
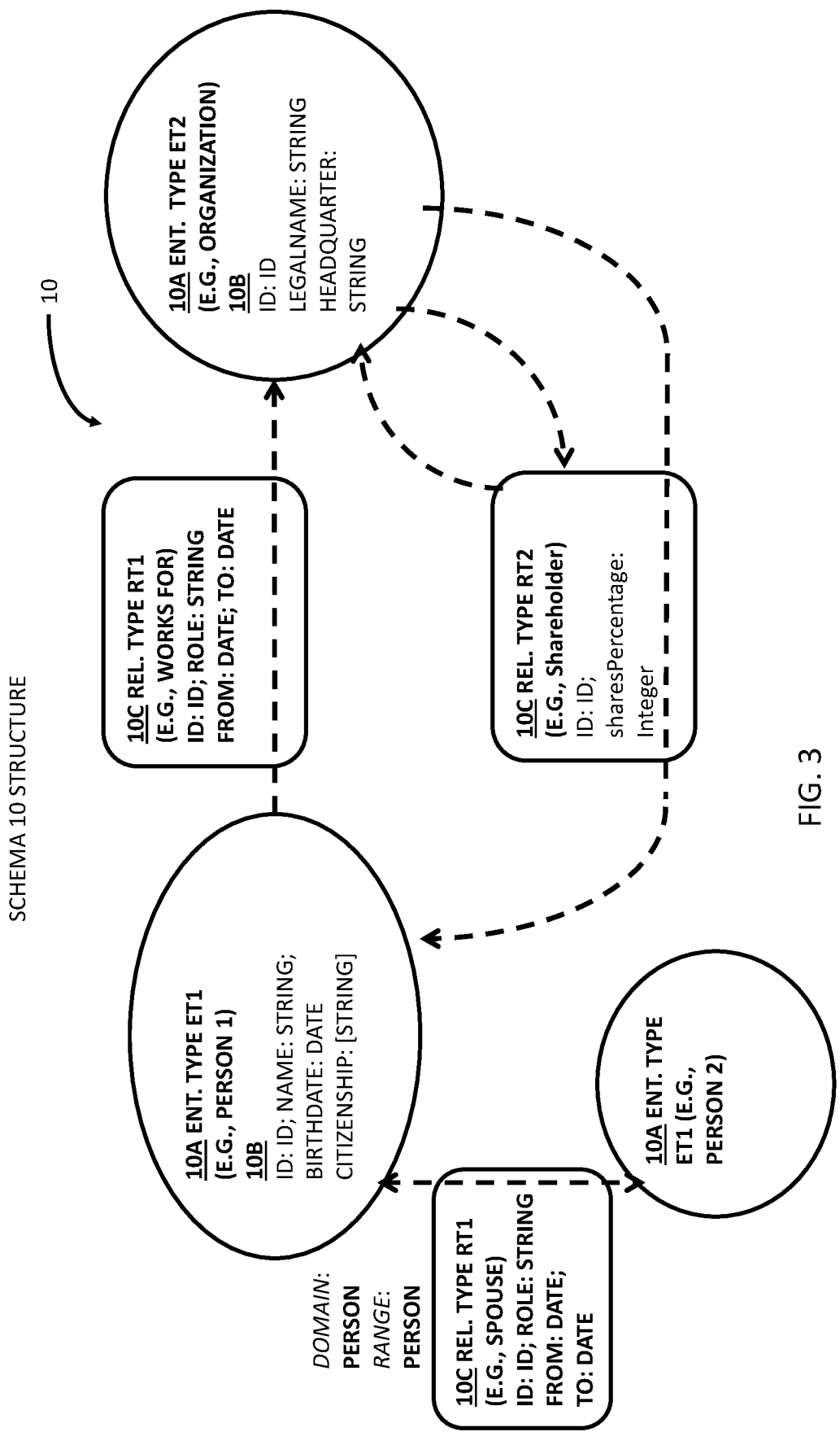
FIG. 3 is a schematic diagram, depicting an example of schema data structure, which may be used by a system for domain-agnostic extraction and/or integration of knowledge, according to some embodiments of the invention.

Reference is also made to FIG. 3 which is a schematic diagram, depicting an example of a schema data structure 10, which may be used by a system for domain-agnostic extraction and/or integration of knowledge, according to some embodiments of the invention.

As elaborated herein (e.g., in Table 1), domain schema 10 may include a definition of one or more domain objects, such as domain entity types 10A, domain attribute types 10B and/or domain relation types 10C.

The term "definition" may be used in this context to infer a determined data structure type (e.g., a "class") that may be identified by a unique identifier. The term "identifier" may be used in this context to a data element (e.g., a string, a number, etc.) that may identify or represent an instance of a domain object such as a domain entity type 10A, domain attribute type 10B and/or domain relation type 10C.

For example, domain schema 10 may include a definition of one or more domain entity types 10A. For example, in FIG. 3 a first domain entity type 10A may be defined as entity type (ET)1, such as a "person", and a second domain entity type 10A may be defined as ET2 such as an "organization". In this example, a unique identifier of domain entity type 10A ET1 ("person") may be a string representing a name of an actual person (e.g., "John Doe"), and a unique identifier of domain entity type 10A ET2 ("organization") may be a string representing a name of a company (e.g., "Microsoft").

In another example, domain schema 10 may include a definition of one or more domain attribute types 10B that may characterize, or be attributed to the one or more domain entities 10A. For example, as shown in FIG. 3, a domain attribute type 10B such as a "Birthdate", of a data type "string" may be attributed to domain entity type 10A ET1 (e.g., "person"). In this example, an identifier of the "Birthdate" domain attribute 10B for instance domain entity 10A ET1 may be "Jan. 1, 2000".

In another example, domain schema 10 may include a definition of one or more domain relation types 10C that may define a relation between at least two domain entities 10A. For example, as shown in FIG. 3, a domain relation type 10C such as a relation type (RT)1 ("works for") may define a relation of employment between a "person" domain entity 10A and an "organization" domain entity 10A.

As shown in FIG. 2, system 100 may include one or more fetcher modules 120. Each fetcher module 120 may be, or may include at least one ML model 121.

Figure 4:
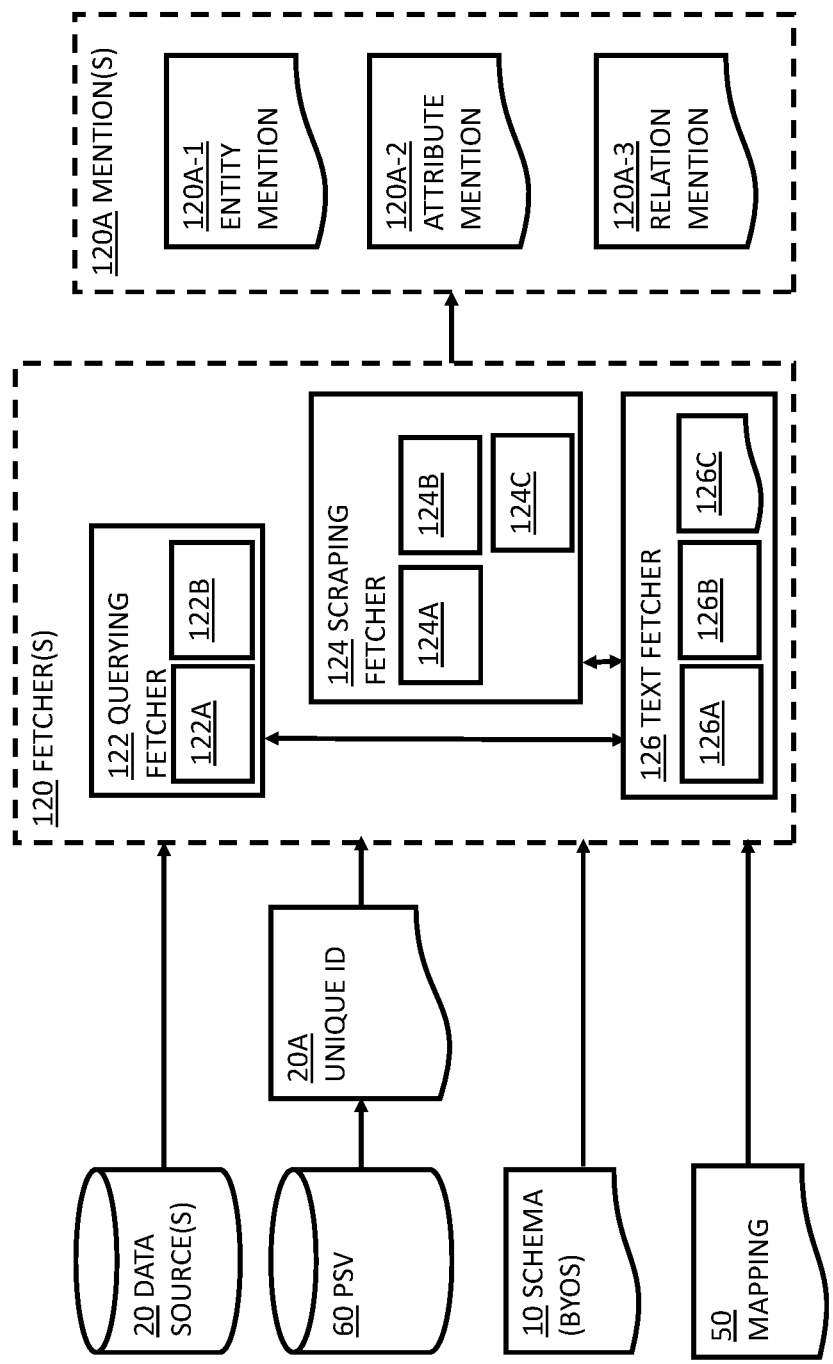
FIG. 4 is a block diagram, depicting a fetcher module which may be included in a system for domain-agnostic extraction and/or integration of knowledge, according to some embodiments of the invention.

Reference also made to FIG. 4 which is a block diagram, depicting a fetcher module 120 which may be included in a system 100 for domain-agnostic extraction and/or integration of knowledge, according to some embodiments of the invention.

As shown in FIG. 4, fetcher module 120 may be, or may include one or more specific fetchers of various types. Such specific fetcher modules are denoted in FIG. 4 as querying fetcher(s) 122, scraping fetcher(s) 124, and text fetcher(s) 126. According to some embodiments, each specific fetcher module (122, 124, 126) may be, or may include at least one respective, specific ML model (e.g., element 121 of FIG. 2). These specific ML models are denoted as elements 122A, 124A and/or 126A of FIG. 4.

According to some embodiments, the at least one ML model 121 (e.g., 122A, 124A, 126A) may be trained to fetch one or more mentions 120A from one or more data sources 20. In other words, the at least one ML model 121 may be trained to fetch one or more mentions 120A from one or more documents 20' (e.g., textual data elements, web pages, etc.) of data sources 20, as elaborated herein.

In other words, fetcher module(s) 120 (e.g., 122, 124, 126) may use at least one ML model 121 (e.g., 122A, 124A, 126A) to fetch from the plurality of data sources 20 one or more mentions 120A. The one or more mentions may include entity mentions (e.g., mentions of instantiations of domain entity types 10A), attribute mentions (e.g., mentions of instantiations of domain attribute types 10B) and/or relation mentions (e.g., mentions of instantiations of domain relation types 10C).

According to some embodiments, ML models 122A, 124A, and 126A may be of different types, and may be trained on annotated data corresponding to the type of each respective fetcher (122, 124, 126 respectively).

For example, querying fetcher 122 may be adapted to obtain at least one document 20' (e.g., a table) from at least one data source 20 such as a database 20. Querying fetcher 122 may, for example query one or more databases 20 (e.g., SQL databases), by using appropriate Application Programming Interface (API) functions 122B (e.g., SQL APIs), as known in the art, to obtain the one or more documents 20' (e.g., tables) from the database data sources 20.

According to some embodiments, ML model 122A may subsequently be trained based on annotated or labeled documents 20' (e.g., annotated tables) to fetch one or more mentions 120A from the plurality of obtained documents 20' (e.g., tables), as elaborated herein.

In another example, scraping fetcher 124 may be adapted to obtain at least document 20', such as a web page, or any component or element included in a web page from a data source 20 such as a web server or website. In this example, document 20' may be, or may include for example HTML code included in data source 20, text (e.g., a textbox) included in data source 20, a video data element (e.g., an embedded video) included in data source 20, a title included in data source 20, an image included in data source 20, a form included in data source 20, and the like. Scraping fetcher 124 may "scrape" or "crawl" (as commonly referred to in the art) through one or more data sources 20 (e.g., websites), by using appropriate web-crawling tools 124B as known in the art, to obtain the one or more documents 20' (e.g., textbox content) from the website data sources 20. Scraping fetcher 124 may produce a textual representation of the one or more documents 20'. For example, document 20' may be a video data element, and scraping fetcher 122 may employ an ML-based model 124C such as a speech-to-text model on document 20' to obtain a textual representation of speech included in the video data element 20'. In another example, document 20' may be an image, and scraping fetcher 122 may employ an ML-based model 124C such as a face recognition model or object recognition model on document 20', to obtain a textual representation (e.g., a list) of people and/or objects included in document 20'. Additional forms of textual representation of elements included in data source 20 (e.g., websites) are also possible.

According to some embodiments, ML model 124A may subsequently be trained based on annotated or labeled documents 20' (e.g., annotated web pages and/or web page components) to fetch one or more mentions 120A from the plurality of obtained documents 20' (e.g., web page components), as elaborated herein.

In yet another example, text fetcher 126 may be adapted to obtain at least one document 20' that is a textual data element, such as an email, a message (e.g., a short message service (SMS) message), a Microsoft Word document, a Portable Document Format (PDF) document, and the like from at least one respective data source 20. Pertaining to the examples above, the at least one respective data source 20 may be, for example, a web server, a mail server, a repository or storage of text documents, and the like.

Additionally, or alternatively, text fetcher 126 may collaborate with one or more other fetchers (e.g., 122, 124) to obtain therefrom at least one textual document 20'. Such textual data elements may include for example textual data elements originating from a database (e.g., via query fetcher 122), a textual representation of a web page component, (e.g., via scraper fetcher 124) and the like. Text fetcher 126 may further process the textual document 20' obtained from fetchers 122 and/or 124 as elaborated herein.

According to some embodiments, text fetcher 126 may apply an ML-based language enrichment model 126B such as a natural language processing (NLP) model 126B on the one or more textual documents 20'. For example, NLP model 126B may be configured to process textual documents 20' so as to extract therefrom one or more linguistic or grammatical features 126C, as known in the art. Such linguistic or grammatical features may include, for example, grammatical roles or syntactic functions of one or more unigrams (e.g., words) and/or ngrams (e.g., combinations of words) included in textual documents 20'.

According to some embodiments, ML model 126A may subsequently be trained based on annotated or labeled documents 20' (e.g., annotated text data elements 80A) to fetch one or more mentions 120A from the plurality of obtained documents 20' (e.g., text data elements), as elaborated herein.

According to some embodiments, the one or more ML models 121 (e.g., 122A, 124A, 126A) may be trained using an automated, remote supervision training scheme. The term "remote" may be used in this context to refer to a form of training that does not require intervention or annotation of examples in a training dataset, but rather repurpose other (e.g., third-party) databases or knowledgebases to obtain the required annotation or labeling.

For example, and as shown in FIG. 2, System 100 may include a mapping module 50, adapted to map, or associate at least one domain entity type 10A defined by schema 10, to one or more corresponding terms defined by a semantic vocabulary (SV) knowledge base 60. According to some embodiments, mapping module 50 may perform this mapping, or association automatically, using algorithms of "schema matching" or "ontology alignment" as commonly referred to in the art. The association of at least one domain entity type 10A defined by schema 10, to one or more corresponding terms defined the SV may be implemented or manifested, for example, as a map 50A or table (e.g., in database 6 of FIG. 1), that associates the at least one domain entity type 10A to the one or more terms defined by SV 60. Pertaining to the example schema of FIG. 3, a "Person" domain entity type may be associated by map 50A to terms such as "Human", "Man", "Woman", "Actor", "Policeman", "Giovanni Boccaccio", "George Washington" etc., according to the non-limiting example of Table 2, below:

TABLE 2

| Domain entity type | Semantic vocabulary terms |
|---|---|
| Person | Person |
| | Human |
| | Man |
| | Woman |
| | Actor |
| | Policeman |
| | Giovanni Boccaccio |
| | George Washington |

Additionally, or alternatively, mapping module 50 may receive map 50A as input from a user or software application, e.g., via input device 7 of FIG. 1.

According to some embodiments, system 100 may include an annotation module 80, adapted to (a) obtain from SV knowledge base 60 (e.g., via mapping module 50) one or more identifiers of domain entity instances, based on mapping 50A, and at least one document 20' from fetcher(s) 120. Annotation module 80 may annotate one or more documents 20' of the plurality of documents 20' according to the one or more identifiers.

Pertaining to the example of Table 2 and considering a document 20' that is a textual string such as: "George Washington was the first President of the United States". In this example, annotation module 80 may annotate the above textual document 20', to produce an annotated version 80A of document 20'. The annotated version 80A may include a label, or annotation of the ngram (e.g., the combination of words) "George Washington" as a domain entity type "Person".

According to some embodiments, mapping module 50 and annotation module 80 may repeat the process of annotation as explained above, on a plurality of documents 20' and in relation to a plurality of domain entity types 10A to obtain a plurality of annotated documents 80A. This plurality of annotated documents 80A may be referred herein as an annotated training dataset of documents.

It may be appreciated that the process of self-annotation (e.g., without need for manual labeling of documents 20'), by repurposing currently available SV knowledgebases 60 may dramatically decrease the effort of creating the required training dataset 80A.

According to some embodiments, system 100 may include a training module 90, adapted to train the at least one ML model 121 (e.g., 122A, 124A, 126A) based on the one or more annotated documents 80A, to identify or associate (e.g., at a stage of inference) at least one data element in a document 20' of the plurality of documents 20' to at least one domain entity type.

For example, during a training stage, training module 90 may receive an annotated document 80A from annotation module 80, and receive (e.g., from NLP module 126B) one more linguistic or grammatical features 126C. Pertaining to the example of "George Washington", training module 90 may receive: (a) from annotation module 80, an annotated document 80A, in which "George Washington" is labeled as a domain entity of type "person"; and (b) from NLP module 126B, a grammatical role (e.g., subject of the sentence) of "George Washington". Training module 90 may train ML model 121 (e.g., 122A, 124A, 126A) based on this received data to identify data elements (e.g., unigrams, ngrams, words, etc.) as representing domain entity types (e.g., "person") in new examples of documents.

For example, consider an example that the name "Francois Mitterrand" is not included in SV 60 and therefore the name "Francois Mitterrand" is not associated by map 50A to a "person" domain entity 10A. During an inference stage, ML model 121 (e.g., 122A, 124A, 126A) may be introduced with a new example document 20' such as: "Francois Mitterrand is a French Politician". ML model 121 may further receive (e.g., from NLP 126B) grammatical features 126C corresponding to the ngram "Francois Mitterrand" in the received text document 20'. Based on its training, ML model 121 may identify or associate the ngram "Francois Mitterrand" as representing a domain entity of type "person".

Hence, fetcher(s) 120 may extract or fetch one or more mentions 120A of domain entities from the plurality of documents 20', based on the association of SV 60 terms (e.g., "George Washington") with domain entity types 10A (e.g., "person") of schema 10. In this example, fetcher 120 may fetch the mention of "Francois Mitterrand", as an instantiation of a domain entity type 10A "person", from a new example document 20'.

According to some embodiments, fetcher(s) 120 may be configured to fetch one or more mentions 120A of domain relations (e.g., mentions 120A of instantiations of domain relation types), in a similar manner to the fetching of mentions 120A of domain entity type 10A instantiations, as elaborated above.

For example, mapping module 50 may map at least one domain relation type 10C, defined by the schema, to one or more corresponding terms defined by SV knowledge base 60. Pertaining to the schema 10 example of FIG. 3, domain relation type 10C may define a relation of employment, and map 50A may associate a domain relation type 10C such as "Works for" with one or more corresponding terms defined by SV knowledge base 60, such as "works for", "employed", "manages", "plays for", etc.

Annotation module 80 may obtain from SV knowledge base 60 one or more identifiers of domain relation instantiations, based on the mapping, and may annotate one or more documents 20' of the plurality of documents 20' according to the one or more identifiers, to produce an annotated version 80A of document 20'. For example, Annotation module 80 may receive as input a document 20' such as the sentence: "Michael Jordan plays for the Chicago Bulls", and may produce an annotated or labeled document 80A in which: (a) "Michael Jordan" is annotated as an instantiation of the domain entity type "person", (b) "Chicago Bulls" is annotated as an instantiation of the domain entity type "organization", and (c) "plays for" is annotated as an instantiation of the domain relation type 10C "works for".

According to some embodiments, training module 90 may train the one or more ML models 121 (e.g., 122A, 124A, 126A) based on annotated document 80A, to identify or associate (e.g., during a stage of inference) at least one data element in a document 20' of the plurality of documents 20' as an instantiation of the at least one domain relation type 10C.

For example, during a stage of inference, given the sentence "Magic Johnson was hired by the Los-Angeles Lakers", ML model 121 (e.g., 122A, 124A, 126A) may identify the ngram "hired by" (which may not have been included in map 50A) as representing an instantiation of a "works for" domain relation type 10C, based on its training.

In other words, ML model 121 (e.g., 122A, 124A, 126A) may fetch one or more mentions of instantiations of domain relation types from the plurality of documents 20', based on the association of SV 60 terms (e.g., "plays for") with domain relation types 10C (e.g., "works for") of schema 10.

According to some embodiments, fetcher 120 may associate or link (e.g., via a table, a linked list, and the like) one or more fetched mentions 120A of domain relation type 10C instantiations (e.g., "works for") with one or more mentions of domain entity type instantiations (e.g., "Magic Johnson" and "Los-Angeles Lakers"). Thus, fetcher 120 may maintain data pertaining to relations of specific domain entities as obtained from the relevant document 20'.

According to some embodiments, fetcher(s) 120 may be configured to fetch one or more mentions 120A of domain attributes (e.g., mentions 120A of instantiations of domain attribute types 10B), in a similar manner to the fetching of mentions 120A of domain entity type 10A instantiations, as elaborated above.

For example, mapping module 50 may map 50A at least one domain attribute type 10B, defined by the schema, to one or more corresponding terms defined by SV knowledge base 60. Pertaining to the schema 10 example of FIG. 3, domain attribute type 10B may be "Birthdate", and map 50A may associate domain attribute type 10B with one or more corresponding terms defined by SV knowledge base 60, such as "DOB", "Date of birth", "Birthday", "Birth date", "birthdate", etc.

Annotation module 80 may obtain from SV knowledge base 60 one or more identifiers of domain attribute instantiations, based on the mapping, and may annotate one or more documents 20' of the plurality of documents 20' according to the one or more identifiers, to produce an annotated version 80A of document 20'. For example, Annotation module 80 may receive as input a document 20' such as the sentence: "the date of birth of the author of this article is Dec. 23, 1970", and may produce an annotated or labeled document 80A in which: "Dec. 23, 1970" is annotated as an instantiation of the domain attribute type "Birthdate".

According to some embodiments, training module 90 may receive annotated document 80A and/or grammatical features or definitions 126C corresponding to the ngram "Dec. 23, 1970" (e.g., a "date"). Training module 90 may train the one or more ML models 121 (e.g., 122A, 124A, 126A) based on annotated document 80A and/or grammatical features 126C, to identify or associate (e.g., during a stage of inference) at least one data element in a document 20' of the plurality of documents 20' as an instantiation of the at least one domain attribute type 10B (e.g., "birthdate").

For example, during a stage of inference, given the sentence "Albert Einstein was born on Mar. 14, 1879", ML model 121 (e.g., 122A, 124A, 126A) may identify the ngram "Mar. 14, 1879" as representing an instantiation of a "birthdate" domain attribute type 10B, based on its training and/or grammatical features 126C, even if the ngram "born on" may not have been included in map 50A.

In other words, ML model 121 (e.g., 122A, 124A, 126A) may fetch one or more mentions of instantiations of domain attribute types from the plurality of documents 20', based on the association of SV 60 terms (e.g., "date of birth") with domain attribute types 10B (e.g., "birthdate") of schema 10.

As shown in FIG. 2, system 100 may include at least one entity resolution module 130, which may be, or may include at least one ML model 136. According to some embodiments, and as elaborated herein (e.g., in relation to FIG. 6), entity resolution module 130 may use the at least one ML model 136 to obtain, or extract from the one or more mentions 120A, at least one domain-specific entity 130A (or domain entity 130A, for short) that may correspond to the one or more domain entity types 10A defined by domain schema 10.

According to some embodiments, fetcher 120 may associate or link (e.g., via a table, a linked list, and the like) one or more fetched mentions 120A of domain attribute type 10B instantiations (e.g., "Mar. 14, 1879") with one or more mentions of domain entity type instantiations (e.g., "Albert Einstein"). Thus, fetcher 120 may maintain data pertaining to attributes of specific domain entities as obtained from the relevant document 20'.

Pertaining to the domain schema example of FIG. 3, entity resolution module 130 may receive a plurality of mentions 120A of "person" domain entities and a plurality of mentions 120A of "organization" domain entities, and may produce, or extract one or more domain entities 130A pertaining to a "person" (e.g., a first person and a second person), and one or more domain entities 130A pertaining to an "organization" (e.g., a first organization and a second organization).

For example, entity resolution module 130 may receive a plurality of mentions 120A originating from documents 20' of the plurality of data sources 20, and relating to a specific real-world "person" domain entity 10A, such as "John Doe", "J. Doe", "John Abrahams Doe" and the like. Entity resolution module 130 may obtain, or extract from the plurality of entity mentions 120A, a single domain entity 130A pertaining to, or representing the specific, real-world person (e.g., "John Doe").

As shown in FIG. 2, system 100 may include at least one attribute resolution module 140, which may be, or may include at least one ML model 146. According to some embodiments, and as elaborated herein, attribute resolution module 140 may use the at least one ML model 146 to obtain, or extract from one or more mentions 120A of attributes, at least one domain attribute 140A that corresponds to the one or more domain attribute types 10B defined by domain schema 10.

Pertaining to the domain schema example of FIG. 3, attribute resolution module 140 may obtain, from the plurality of attribute mentions 120A, originating from the plurality of data sources 20 a "birthdate" domain attribute 140A pertaining to the "first person" domain entity (e.g., "P1"), a "birthdate" domain attribute 140A pertaining to the "second person" domain entity (e.g., "P2"), a "headquarter" domain attribute 140A pertaining to the "first organization" domain entity (e.g., "O1"), and a "headquarter" domain attribute 140A pertaining to the "second organization" domain entity (e.g., "O2"), as elaborated herein.

For example, attribute resolution module 140 may receive a plurality of mentions 120A originating from documents 20' of the plurality of data sources 20, and relating to a "birthdate" domain attribute of a real-world "person" domain entity 10A. These "birthdate" domain attribute mentions may include "Apr. 1, 2020", "1/4/2000" (Gregorian, European format), "4/1/2000" (Gregorian, US format), "26th Dhul Hijjah, 1420" (Islamic calendar format), a free text mention, such as: "His birthday was on Saturday", and the like. Attribute resolution module 140 may reconcile between at least one first domain attribute mention 120A at least one first domain attribute mention 120A to produce a common, representative domain attribute mention 120A. For example, attribute resolution module 140 may obtain, or extract from the plurality of domain attribute mentions 120A, a single domain attribute 140A (e.g., "Apr. 1, 2020"), pertaining to, or representing the birthdate of the specific, real-world person. Attribute resolution module 140 may subsequently collaborate with KG generator module 160 to integrate the common attribute into a KG 160A, based on domain schema 10, as elaborated herein.

Additionally, or alternatively, attribute resolution module 140 may apply predefined selection algorithms to resolve and/or integrate attribute mentions 120. For example, system 100 may receive a plurality of versions for an "address" attribute, pertaining to a single domain entity instance, from a respective plurality of data sources 20. In such embodiments, the predefined selection algorithm may, for example be configured to select an address that matches a predefined structuring template (e.g., includes a minimal number of predefined fields).

In another example, attribute resolution module 140 may receive (e.g., from input element 7 of FIG. 1) a numerical reliability score value for one or more (e.g., each) data source 20, representing a user's confidence on the reliability of the relevant data source. In a condition that plurality of attribute mention 120 include contradicting information, attribute resolution module 140 may resort to selecting a value of a specific attribute mention 120, corresponding to the highest reliability score among the plurality of contradicting attribute mention 120.

As shown in FIG. 2, system 100 may include at least one relation resolution module 150, which may be, or may include at least one ML model 156. According to some embodiments, and as elaborated herein, relation resolution module 150 may use the at least one ML model 156 to obtain, or extract from one or more mentions 120A of relations, at least one domain relation 150A that corresponds to the one or more domain relation types 10C defined by domain schema 10.

Pertaining to the domain schema example of FIG. 3, relation resolution module 150 may obtain from the plurality of relation mentions 120A, originating from the plurality of data sources 20, a "works for" domain relation 150A describing an employment relation between a first "person" domain entity (e.g., "P1") and a first "organization" domain entity (e.g., "O1"). Additionally, relation resolution module 150 may obtain from the plurality of relation mentions 120A a "shareholder" domain relation 150A, describing a relation of equity stock holding between a second "person" domain entity (e.g., "P2") and a second "organization" domain entity (e.g., "O2").

For example, relation resolution module 150 may receive a plurality of mentions 120A originating from documents 20' of the plurality of data sources 20, and relating to an employment relation between a specific, real world "person" domain entity (e.g., "P1") and one or more real world "organization" domain entities (e.g., Google, Microsoft, and the like). These mentions 120A may be, or may include text data elements or strings such as " . . . was employed by Google . . . ", " . . . is in Microsoft . . . ", " . . . is working for Microsoft . . . ", " . . . manages Microsoft's R&D team . . . ", etc. Relation resolution module 150 may obtain, or extract from the plurality of entity mentions 120A, a single domain relation 150A (e.g., "works for"), defining a current working relation between the real-world person (e.g., "P1") and a specific, real-world organization (e.g., Microsoft).

Figure 5:
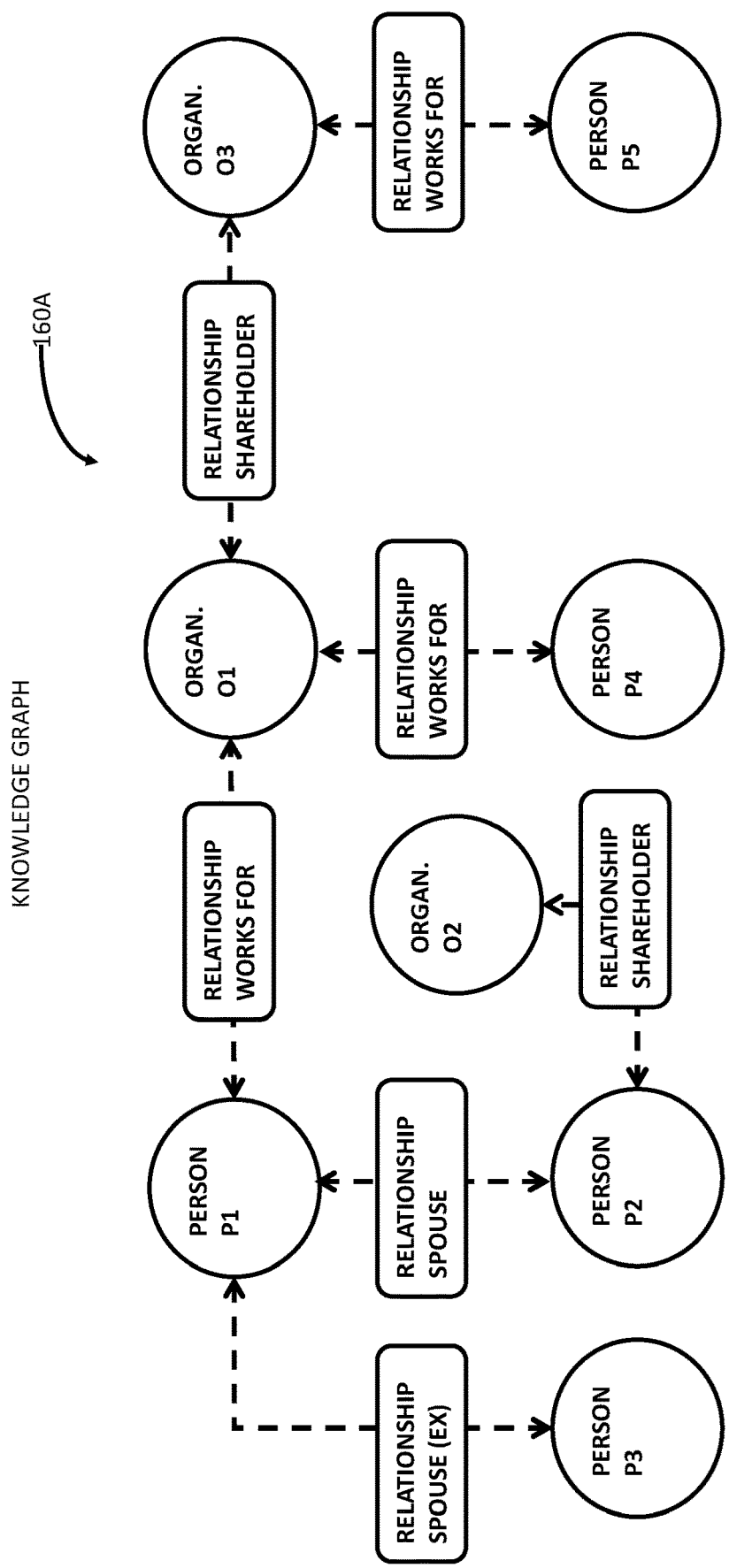
FIG. 5 is a schematic diagram, depicting an example of a knowledge graph data structure, which may be produced by a system for domain-agnostic extraction and/or integration of knowledge, according to some embodiments of the invention.

As shown in FIG. 2, system 100 may include a KG generator module 160, adapted to receive one or more domain objects, such as domain entities 130A, domain attributes 140A and/or domain relations 150A, and integrate the one or more extracted domain objects (e.g., domain entities 130A, domain attributes 140A and/or domain relations 150A) into a knowledge graph 160A, based on the domain schema 10, as elaborated herein (e.g., in relation to FIG. 5).

Reference is also made to FIG. 5 which is a schematic diagram, depicting an example of a knowledge graph data structure 160A, which may be produced by a system 100 for domain-agnostic extraction and/or integration of knowledge, according to some embodiments of the invention.

As shown in the example of FIG. 5, KG generator module 160 may integrate into KG 160A one or more domain objects (e.g., domain entities 130A, domain attributes 140A, and/or domain relations 150A). The term "integrated" may be used in this context in a sense that KG generator module 160 may include, or aggregate (e.g., over time) in KG 160A domain objects such as domain entities 130A, domain attributes 140A and/or domain relations 150A. KG generator module 160 may integrate these objects into KG 160A based on predefined domain schema 10 in a sense that entities, roles, relations and attributes of these domain objects are as defined or dictated by the domain schema 10 (e.g., as in the example of FIG. 3).

For example, and following the examples elaborated above, a first "person" named "P1" has a "work for" relation with a first "organization", named "O1"; and a second "person", named "P2" has a "shareholder" relationship with a second "organization", named "O2". Other domain objects (domain entities 130A, domain attributes 140A and/or domain relations 150A) are also visible in the example KG of FIG. 5.

Figure 6:
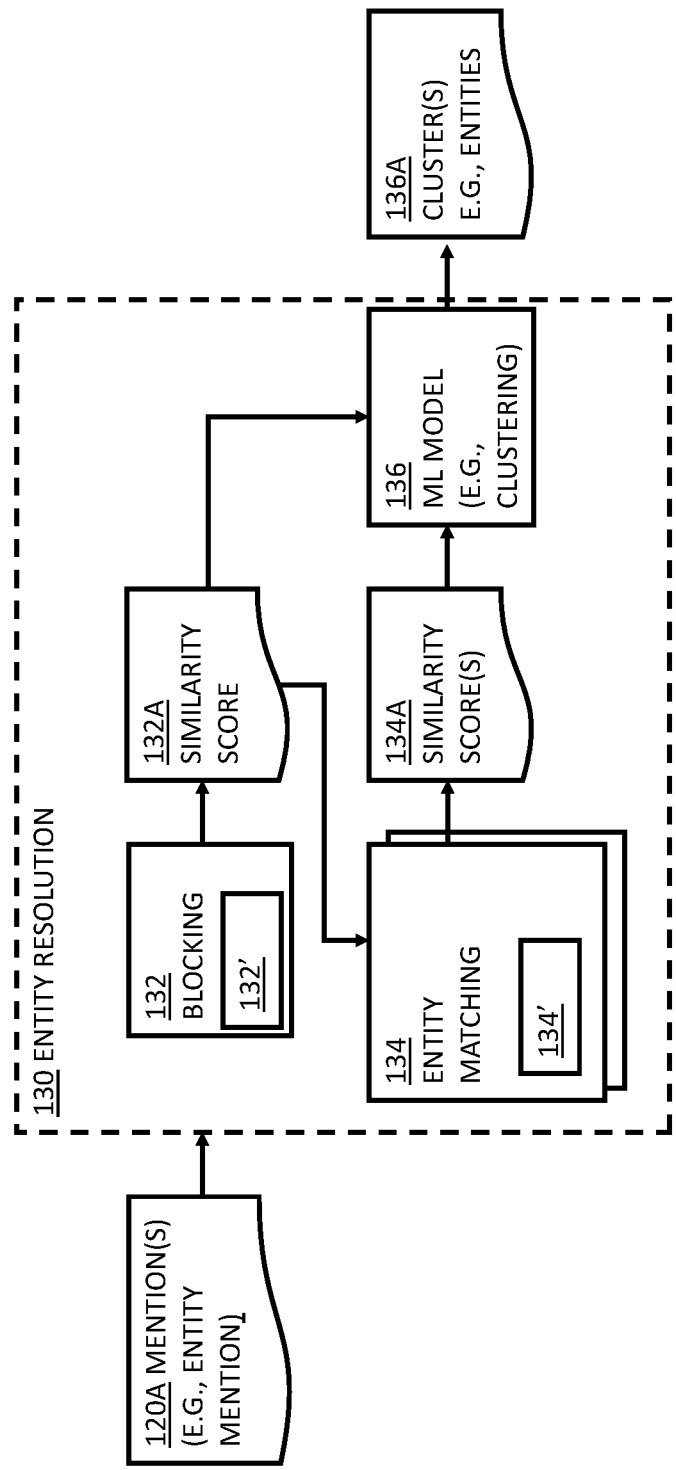
FIG. 6 is a block diagram, depicting an entity resolution module which may be included in a system for domain-agnostic extraction and/or integration of knowledge, according to some embodiments of the invention.

Reference is now made to FIG. 6 which is a block diagram, depicting an entity resolution module 130 which may be included in a system 100 for domain-agnostic extraction and/or integration of knowledge, according to some embodiments of the invention. Entity resolution module 130 may be configured to implement entity resolution as a hierarchical process, to facilitate scalability, as elaborated herein.

According to some embodiments, the hierarchical entity resolution module 130 may include a blocking module 132, an entity matching module 134 and a clustering module 136.

According to some embodiments, blocking module 132 may be configured to apply one or more coarse tests on mentions 120A, to find pairs of mentions 120A that may pertain to the same real-world entity. Blocking module 132 may calculate a first similarity score 132A, representing similarity among two or more (e.g., pairs) of mentions 120A, and may filter out pairs of mentions for which similarity score 132A does not surpass a predefined threshold. Blocking module 132 may be scalable to provide initial, coarse scanning of large amounts of data based on the first similarity score.

According to some embodiments, blocking module 132 may be or may include an ML model 132', such as a neural network (NN) model which may be pretrained to predict a similarity score between mentions 120A of domain entity type 10A instantiations. For example, during a training stage, blocking module 132 ML model 132' may receive a training dataset, that may include a plurality of pairs of mentions 120A (e.g., "Bob Dylan" and "Robert Allen Zimmerman"), where each pair of mentions 120A may be labeled or annotated as either representing the same real world entity, or not. ML model 132' may be trained, based on this annotated training dataset to classify, or predict (e.g., at a subsequent, inference stage) a probability that new examples of pairs of mentions 120A represent the same real-world domain entities (e.g., representing the same person, organization, etc.).

According to some embodiments, ML model 132' of blocking module 132 may further emit a confidence level value, presenting a probability that an introduced pair of mentions 120A represent the same real-world domain entity. In such embodiments, similarity score 132A may be, or may be a function of this confidence level value.

According to some embodiments, entity matching module 134 may calculate a second similarity score 134A representing similarity among the two or more mentions, based on the first similarity score 132A. For example, entity matching module 134 may compute fine-grained, second similarity scores 134A for pairs of mentions 120A that have passed the filter of blocking module 132, as elaborated herein. Entity matching module 134 may be formed or configured to produce high precision results, and may thus be allowed to have lower performance (e.g., lower throughput) in relation to the blocking module. In other words, the first similarity score 132A may represents similarity among two or more mentions 120A in a first resolution or precision level, and the second similarity score 134A may represent similarity in a second, superior resolution or precision level.

The terms "resolution" or "precision" may be used in this context to infer to a level of detail by which one domain entity may be separated from another domain entity. For example, the mentions of "student" and "teacher" may both indicate a "person" real-world domain entity. Therefore, this pair of mentions may be attributed a high first similarity score 132A as both relating to a "person" domain entity type. In this example, "student" and "teacher" may have a high second similarity scores 134A as representing a specific type of "person" (e.g., person in academia), but may have a low second similarity scores 134A as representing a different type of "person" (e.g., a supervising person).

Additionally, or alternatively, entity resolution module 130 may include a plurality of entity matching modules 134, configured to work in parallel, where each entity matching module 134 instance may be adapted to perform a different test of similarity on mentions 120A, so as to calculate second similarity score 134A in parallel.

For example, entity matching module 134 may receive from blocking module 132 two mentions 120A of "person" domain entity type 10A instantiations. The two domain entity mentions 120A may include, or may be associated with the following domain attribute mentions 120A and domain relation mentions 120A, as elaborated in table 3, below:

TABLE 3

| Attribute | Relation | First mention | Second mention |
| --- | --- | --- | --- |
| Name | | Albert Einstein | A. Einstein |
| Birthdate | | 14 Mar. 1879 | March 1879 |
| Place of birth | | Unknown | Germany |
| Age | | One hundred and forty two | 142 |
| | Works for | Swiss Patent Office | Princeton University |

According to some embodiments, entity matching module 134 may include one or more (e.g., a plurality) of test modules 134', each adapted to determine a portion, or component of similarity score 134A. Pertaining to the example of Table 3, entity matching module 134 may: (a) calculate, by a first test module 134', a first interim score representing similarity of the "name" attribute mention 120A, (b) calculate, by a another test module 134', another interim score, representing similarity of the "birthdate" attribute mention 120A, (c) calculate, by a another test module 134', another interim score, representing similarity of the "place of birth" attribute mention 120A, (d) calculate, by a another test module 134', another interim score, representing similarity of the "age" attribute mention 120A, and (e) calculate, by a another test module 134', another interim score, representing similarity of the "works for" relation mention 120A. Entity matching module 134 may aggregate (e.g., sum, calculate a weighted sum, average, calculate a weighted average, and the like) the plurality of interim scores of the respective plurality of test modules 134' to produce a single similarity score 134A. Single similarity score 134A may represent similarity, or likelihood that the two "person" domain entity type 10A instantiations represent the same real-world person.

According to some embodiments, one or more (e.g., each test module 134') may calculate the respective interim score based on one or more predefined rules. For example, first test module 134' may compare the "name" attribute mentions 120A "Albert Einstein" and "A. Einstein" according to a similarity rule of abbreviation. In this example first test module 134' may produce a relatively high score (e.g., 0.9 in the range of [0, 1.0]) due to the fact that "A. Einstein" may have high probability of being an abbreviation of "Albert Einstein".

Additionally, or alternatively, test module 134' may produce an indication of the rule by which the respective interim similarity score was attributed to the relevant pair of mentions 120A. Pertaining to the example of "Albert Einstein" and "A. Einstein", test module 134' may produce an indication that the interim score (e.g., 0.9) was attributed to the pair of "name" attribute mentions 120A due to the rule of abbreviation.

In another example, a similarity rule may be a rule of transposition, by which a pair of attribute mentions 120A (e.g., a first "name" attribute mention 120A such as "John Smith" and a second "name" attribute mention 120A such as "Smith John") may be attributed a high interim score based the fact that one is a transposition of the other. Additional similarity rules may also be possible.

According to some embodiments, output of the entity matching module 134 may be a data structure, such as a matrix or table, which may associate each pair of mentions 120A to a specific calculated second similarity score 134A. Clustering module 136 may receive the matrix of pairwise similarity scores 134A from entity matching module 134, and may cluster the mentions 120A into clusters 136A, according to similarity scores 134A. In such embodiments, each cluster 136A may represent a single real-world entity. Clustering module 136 may thus determine which of the mentions 120A are associated with, or relate to the same real-world entities.

In other words, entity resolution module 130 may receive, from at least one ML model 121 of fetcher(s) 120 a plurality of mentions that correspond to a domain entity type 10A (e.g., "person", "organization", etc.) defined by schema 10. Entity resolution module 130 may use at least one ML-based clustering model 136 to cluster the plurality of mentions 120A into clusters 136A, based on at least one of similarity score 132A and similarity score 134A. In such embodiments, each cluster 136A may represent an instantiation (e.g., Albert Einstein) of a domain entity type 10A (e.g., "person") in the real world. Entity resolution module 130 may thus produce at least one domain entity data structure 130A based on the clustering. Domain entity data structure 130A may represent the real-world entity, and may include, or may be associated with an aggregation of attribute mentions 120A and/or relation mentions 120A of the real-world entity, as obtained from documents 20'.

Additionally, or alternatively, attribute resolution module 140 may use ML model 146 to perform attribute resolution in a similar manner as described herein in relation to entity resolution (e.g., in FIG. 6), to produce at least one domain attribute 140A. Additionally, or alternatively, relation resolution module 150 may use ML model 156 to perform relation resolution in a similar manner as described herein in relation to entity resolution (e.g., in FIG. 6), to produce at least one domain relation 150A. Such processes of attribute resolution and/or relation resolution will not be repeated here, for the purpose of brevity.

For example, attribute resolution module 140 may receive, from at least one ML model 121 of fetcher(s) 120 a plurality of mentions 120A that correspond to a domain attribute type 10B (e.g., "birthdate") defined by schema 10. Attribute resolution module 140 may use an ML-based clustering model 146 to cluster the plurality of mentions 120A into clusters (e.g., similar to element 136A of FIG. 6), based on at least one similarity score (e.g., similar to element 132A and/or element 134A of FIG. 6). In such embodiments, each cluster may represent an instantiation of a domain attribute type 10B (e.g., "birthdate") in the real world. Attribute resolution module 140 may thus produce at least one domain attribute data element 140A based on the clustering of ML-based clustering model 146. Domain attribute data element 140A may represent a real-world attribute of a real-world entity, as obtained from documents 20'.

In another example, relation resolution module 150 may receive, from at least one ML model 121 of fetcher(s) 120 a plurality of mentions 120A that correspond to a domain relation type 10C (e.g., "works for") defined by schema 10. Relation resolution module 150 may use an ML-based clustering model 156 to cluster the plurality of mentions 120A into clusters (e.g., similar to element 136A of FIG. 6), based on at least one similarity score (e.g., similar to element 132A and/or element 134A of FIG. 6). In such embodiments, each cluster may represent an instantiation of a domain relation type 10C (e.g., "works for") in the real world. Relation resolution module 150 may thus produce at least one domain relation data element 150A based on the clustering of ML-based clustering model 156. Domain relation data element 150A may represent a real-world relation between two or more real-world entities, as obtained from documents 20'.

As shown in FIG. 2, system 100 may produce at least one domain-specific application 170, adapted to consume data from KG 160A. Application 170 may include, for example one or more elements of source code or executable code (e.g., element 5 of FIG. 1), adapted to be executed or run by one or more processors (e.g., processor 2 of FIG. 1). Application 170 may be referred to as "domain-specific" in a sense that it may include one or more functions or procedures, adapted to consume (e.g., read, write, update, delete, move, etc.) data from KG 160A, which was in turn compiled or integrated according to the domain-specific definitions of domain schema 10.

For example, system 100 may receive at least one query 30A, pertaining to a domain entity in KG 160A. This query may be formatted in any computing language that is appropriate for management of data, including for example a data manipulation language (DML) such as the Structured Query Language (SQL). System 100 may subsequently apply the domain-specific application 170 on KG 160A, to produce a response 30B to the at least one query. Pertaining to the example of FIG. 5, the at least one query 30A may require a list of all "person" domain entities, with which "person" P1 has had a "spouse" relationship. In this example, domain specific application 170 may include a specific procedure, or Application Programming Interface (API) function, adapted to handle such a query 30A. For example, the API function may be adapted to communicate query 30A to KG 160A, and query for data elements that (a) represent a "spouse" relationship, and (b) are associated with the relevant "person". Domain specific application 170 may use the relevant function or API to retrieve the relevant information from KG 160A. Domain specific application 170 may then produce a corresponding query response 30B. In this example, query response 30B may be a list consisting of person "P2" and person "P3".

Figure 7:
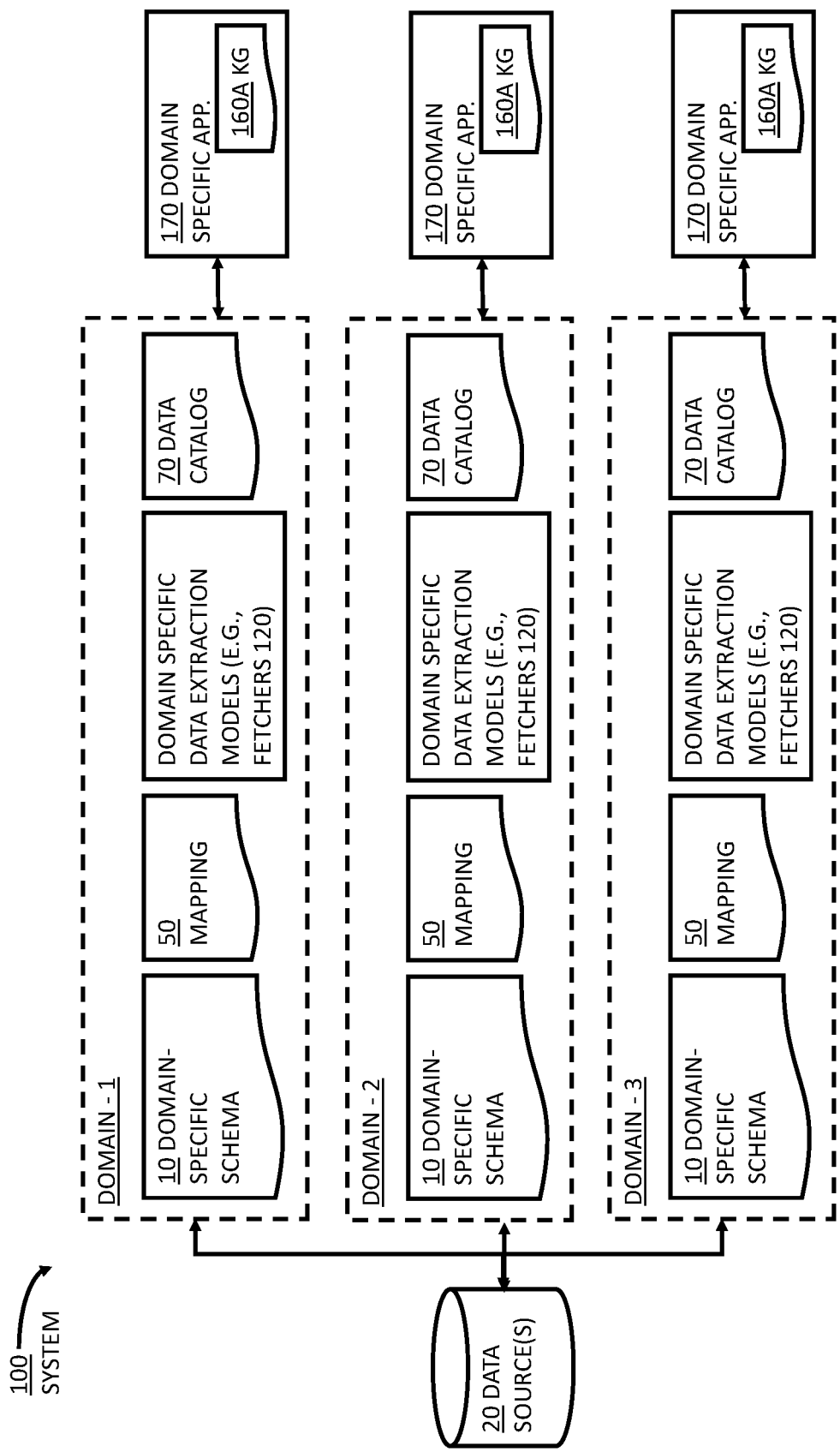
FIG. 7 is a schematic block diagram depicting an example of an implementation of a system for performing domain-agnostic extraction and/or integration of knowledge in multiple domains, according to some embodiments of the invention.

Reference is now made to FIG. 7 which is a schematic block diagram depicting an example of an implementation of a system for performing domain-agnostic extraction and/ or integration of knowledge in multiple domains, according to some embodiments of the invention.

As shown in FIG. 7, system 100 may support domain-driven, or domain-specific organization of knowledge, wherein each domain (denoted domain-1, domain-2, and domain-3) corresponds to a specific business field, or a field of knowledge to which embodiments of the invention may be applied.

As shown in the example of FIG. 7, system 100 may receive, for each domain, a domain-specific schema 10 as elaborated herein (e.g., such as the example of FIG. 3). Domain-specific schema 10 may include one or more objects or definitions pertaining to entities, attributes and/or relations in a specific domain.

According to some embodiments, mapping module 50 may produce an association or mapping 50A of at least one domain object type (e.g., domain entity type 10A, domain attribute type 10B, domain relation type 10C), defined by the specific domain schema 10, to one or more corresponding terms defined by a semantic vocabulary knowledge base. Mapping 50A may be domain specific, as defined by the relevant domain schema 10. Additionally, or alternatively, mapping 50A may include one or more associations 50A of domain object types and semantic vocabulary terms that may be common to a plurality of domains.

According to some embodiments, each domain may receive (e.g., from input 7 of FIG. 1) or may be associated with a domain-specific data catalog 70. Data catalog 70 may include, for example a definition or a list (e.g., a list of pointers) of data sources 20 and/or corresponding documents or data elements (e.g., data elements 20' of FIG. 2) that may be used by system 100 to build KG 160A, such as in the example of FIG. 5.

As shown in FIG. 7, KG 160A may be domain-specific. In such embodiments, KG 160A may be used by a domain-specific software application 170 or domain-specific API to manage (e.g., read, write, edit, store, delete, etc.) data elements that represent domain-specific objects (e.g., domain entities 130A, domain attributes 140A and/or domain relations 150A). Additionally, or alternatively, KG 160A may include one or more portions that may be common to, or correspond to a plurality of domains. In such embodiments, applications or A is 170 may manage data elements that represent domain objects which are common to the plurality of domains.

Figure 8:
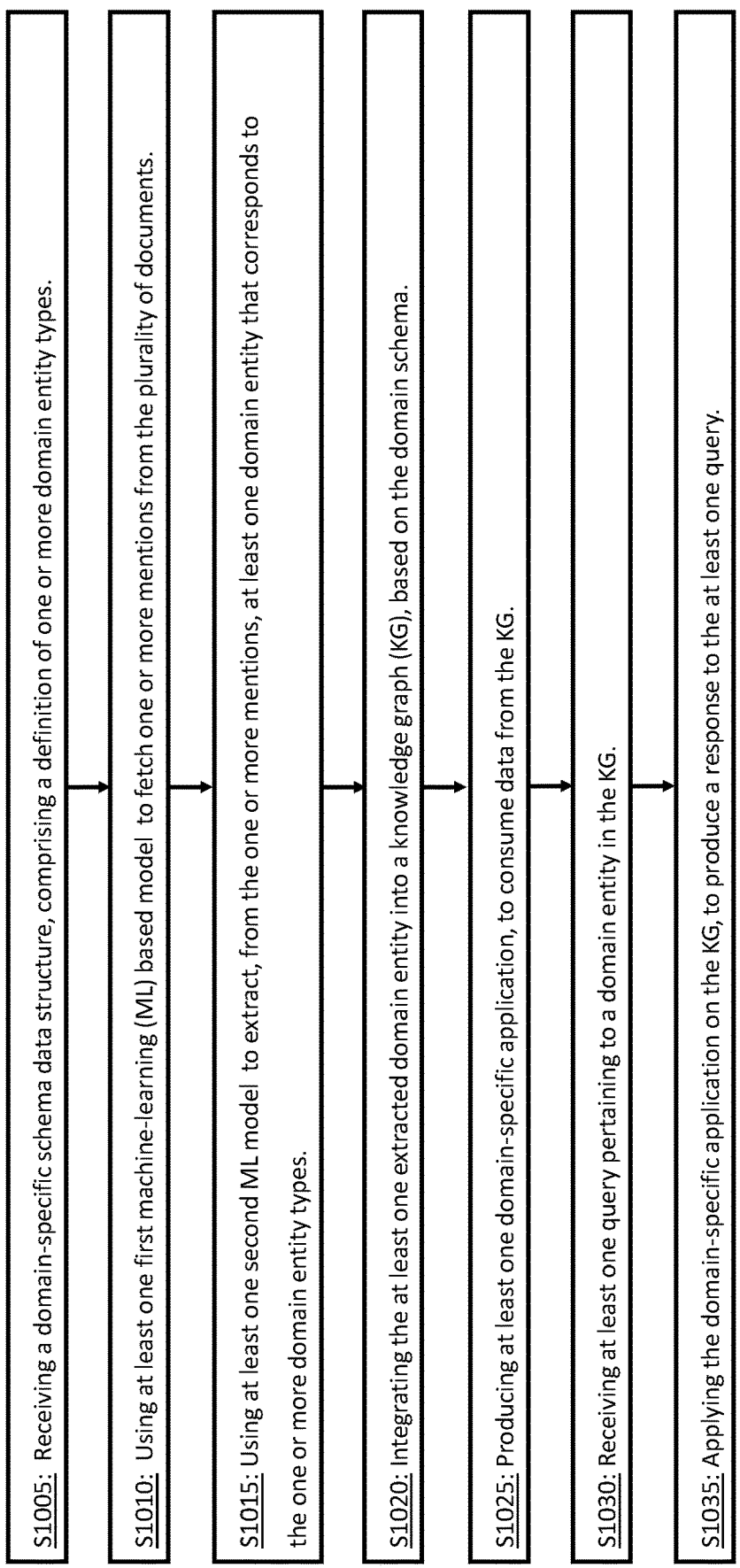
FIG. 8 is a flow diagram, depicting a method of performing, by at least one processor, domain-agnostic extraction and/or integration of knowledge from a plurality of documents, according to some embodiments of the invention.

Reference is now made to FIG. 8 which is a flow diagram, depicting a method of performing, by at least one processor, domain-agnostic extraction and/or integration of knowledge from a plurality of documents 20', according to some embodiments of the invention.

As shown in step S1005, the at least one processor (e.g., processor 2 of FIG. 1) may receive a domain-specific schema data structure 10 (e.g., schema 10 of FIG. 2). Domain-specific schema data structure 10 may include a definition of one or more domain object types (e.g., domain entity types 10A, domain attribute types 10B, domain relation types 10C), as depicted in the example of FIG. 3.

As shown in step S1010, the at least one processor 2 may use at least one first ML-based model (e.g., model 121 of FIG. 2) to fetch one or more mentions (e.g., mentions 120A of FIG. 2) from the plurality of documents 20'.

As shown in step S1015, the at least one processor 2 may use at least one second ML model (e.g., clustering ML model 136, clustering ML model 146 and/or clustering ML model 156 of FIG. 2) to extract from the one or more mentions 120A at least one domain object (e.g., domain entity 130A, domain attribute 140A and/or domain relation 150A of FIG. 2) that corresponds to the one or more domain object types (e.g., domain entity types 10A, domain attribute types 10B, domain relation types 10C).

As shown in step S1020, the at least one processor 2 may employ a KG generator module (e.g., KG generator module 160 of FIG. 2) to build a KG 160A, and/or integrate the at least one extracted domain object (e.g., domain entity 130A) into KG 160A, based on the domain schema.

As shown in step S1025, the at least one processor 2 may produce at least one domain-specific application, function, or API (e.g., element 170 of FIG. 2 and/or FIG. 7), to consume data from the KG 160A. For example, KG 160A may be stored in a database, such as an SQL database. In such embodiments, the at least one processor 2 may automatically produce a domain-specific application 170 that may include at least one software code element (e.g., an SQL query), configured to access (e.g., read, write, edit, delete, etc.) content of the domain-specific KG 160A.

For example, and as shown in steps S1030 and S1035, the at least one processor 2 may receive at least one query (e.g., query 30A of FIG. 2) pertaining to a domain object (e.g., domain entity 130A) in KG 160A. The at least one processor 2 may subsequently apply the domain-specific application or API 170 on KG 160A, to produce a response to the at least one query.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of extracting knowledge from a plurality of documents, by at least one processor, said method comprising:
    receiving a domain-specific schema data structure, comprising a definition of one or more domain entity types;
    using at least one first machine-learning (ML) based model to fetch one or more mentions from the plurality of documents;
    using at least one second ML model to extract, from the one or more mentions, at least one domain entity that corresponds to the one or more domain entity types; and
    integrating the at least one extracted domain entity into a knowledge graph (KG), based on the domain schema.

2. The method of claim 1, further comprising:
    producing at least one domain-specific application, to consume data from the KG;
    receiving at least one query pertaining to a domain entity in the KG; and
    applying the domain-specific application on the KG, to produce a response to the at least one query.

3. The method of claim 1, further comprising:
mapping at least one domain entity type, defined by the schema, to one or more corresponding terms defined by a semantic vocabulary knowledge base;
obtaining from the semantic vocabulary knowledge base one or more identifiers of domain entity instantiations, based on the mapping;
annotating one or more first documents of the plurality of documents according to the one or more identifiers;
training the at least one first ML model based on the one or more annotated first documents to associate at least one data element in a document of the plurality of documents to the at least one domain entity type; and
fetching one or more mentions of entities from the plurality of documents, based on said association.

4. The method of claim 1, wherein the domain-specific schema further comprises a definition of one or more domain relation types, and wherein the at least one first ML model is trained to fetch one or more mentions of relations from the plurality of documents.

5. The method of claim 4, further comprising:
mapping at least one domain relation type, defined by the schema, to one or more corresponding terms defined by a semantic vocabulary knowledge base;
obtaining from the semantic vocabulary knowledge base one or more identifiers of domain relation instantiations, based on the mapping;
annotating one or more first documents of the plurality of documents according to the one or more identifiers;
training the at least one first ML model based on the one or more annotated first documents to associate at least one data element in a document of the plurality of documents to the at least one domain relation type; and
fetching one or more mentions of relations from the plurality of documents, based on said association.

6. The method of claim 4, further comprising:
using the at least one second ML model to obtain from the one or more mentions of relations, at least one domain relation that corresponds to the one or more domain relation types; and
integrating the at least one domain relation into the KG, based on the domain schema.

7. The method of claim 1, wherein the domain-specific schema further comprises a definition of one or more domain attribute types, and wherein the at least one first ML model is trained to fetch one or more mentions of attributes from the plurality of documents.

8. The method of claim 7, further comprising:
mapping at least one domain attribute type, defined by the schema, to one or more corresponding terms defined by a semantic vocabulary knowledge base;
obtaining from the semantic vocabulary knowledge base one or more identifiers of domain attribute instantiations, based on the mapping;
annotating one or more first documents of the plurality of documents according to the one or more identifiers;
training the at least one first ML model based on the one or more annotated first documents to associate at least one data element in a document of the plurality of documents to the at least one domain attribute type; and
fetching one or more mentions of attributes from the plurality of documents, based on said association.

9. The method of claim 8, further comprising:
using the at least one second ML model to obtain from the one or more mentions of attributes, at least one domain attribute that corresponds to the one or more domain relation types; and
integrating the at least one domain attribute into the KG, based on the domain schema.

10. The method of claim 9, wherein the one or more mentions of attributes comprise a plurality of attributes, and wherein the method further comprises:
obtaining a first mention of attribute from the plurality of attributes;
obtaining a second mention of attribute from the plurality of attributes;
reconciling between a first mention of attribute and the second mention of attribute, to produce a common attribute; and
integrating the common attribute into the KG, based on the domain schema.

11. The method of claim 1, wherein obtaining, from the one or more mentions, at least one domain entity comprises:
receiving, from the at least one first ML model a plurality of mentions that correspond to a domain entity type defined by the schema;
using the at least one second ML model to cluster the plurality of mentions into clusters, wherein each cluster represents a domain entity; and
producing at least one domain entity based on the clustering.

12. The method of claim 11, further comprising:
calculating a first similarity score, representing similarity among two or more mentions of the plurality of mentions;
based on the first similarity score, calculating a second similarity score, representing similarity among the two or more mentions; and
using the second ML model to cluster the two or more mentions into clusters, based on the second similarity score.

13. The method of claim 12, wherein the first similarity score represents similarity in a first resolution, and wherein the second similarity score represents similarity in a second, superior resolution.

14. A system for extracting knowledge from a plurality of documents, the system comprising: a non-transitory memory device, wherein modules of instruction code are stored, and at least one processor associated with the memory device, and configured to execute the modules of instruction code, whereupon execution of said modules of instruction code, the at least one processor is configured to:
receive a domain-specific schema data structure, comprising a definition of one or more domain entity types;
use at least one first machine-learning (ML) based model to fetch one or more mentions from the plurality of documents;
use at least one second ML model to extract, from the one or more mentions, at least one domain entity that corresponds to the one or more domain entity types; and
integrate the at least one extracted domain entity into a knowledge graph (KG), based on the domain schema.

15. The system of claim 14, wherein the at least one processor is further configured to:
produce at least one domain-specific application, to consume data from the KG;
receive, from at least one computing device, a query pertaining to a domain entity in the KG; and
apply the domain-specific application on the KG, to produce a response to the at least one query.

16. The system of claim 14, wherein the at least one processor is further configured to:
- map at least one domain entity type, defined by the schema, to one or more corresponding terms defined by a semantic vocabulary knowledge base;
- obtain from the semantic vocabulary knowledge base one or more identifiers of domain entity instantiations, based on the mapping;
- annotate one or more first documents of the plurality of documents according to the one or more identifiers;
- train the at least one first ML model based on the one or more annotated first documents to associate at least one data element in a document of the plurality of documents to the at least one domain entity type; and
- fetch one or more mentions of entities from the plurality of documents, based on said association.

17. The system of claim 14, wherein the domain-specific schema further comprises a definition of one or more domain relation types, and wherein the at least one first ML model is trained to fetch one or more mentions of relations from the plurality of documents.

\* \* \* \* \*